United States Patent
McGavran et al.

(10) Patent No.: US 9,652,486 B2
(45) Date of Patent: May 16, 2017

(54) POWER SAVING TECHNIQUES FOR A NAVIGATION APPLICATION

(71) Applicant: Apple Inc., Cupertino, CA (US)

(72) Inventors: Christine B. McGavran, Pacifica, CA (US); Christopher Y. Tremblay, San Jose, CA (US); Thomas Wagner, Campbell, CA (US); Ketan Singh, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/869,701

(22) Filed: Sep. 29, 2015

(65) Prior Publication Data

US 2016/0360485 A1 Dec. 8, 2016

Related U.S. Application Data

(60) Provisional application No. 62/172,185, filed on Jun. 7, 2015.

(51) Int. Cl.
*H04M 1/00* (2006.01)
*G06F 17/30* (2006.01)
(Continued)

(52) U.S. Cl.
CPC ....... *G06F 17/30368* (2013.01); *G01C 21/20* (2013.01); *G06F 1/3206* (2013.01);
(Continued)

(58) Field of Classification Search
CPC ......... G06F 17/30368; G06F 17/30241; G06F 17/3087; G06F 1/3206; G06Q 10/1095;
(Continued)

(56) References Cited

U.S. PATENT DOCUMENTS

2008/0167937 A1 7/2008 Coughlin et al.
2009/0210261 A1 8/2009 Mortimore, Jr.
(Continued)

FOREIGN PATENT DOCUMENTS

WO PCT/US2016/035924 6/2016

OTHER PUBLICATIONS

Author Unknown, "GoTime by 50PLY," Feb. 18, 2012, 2 pages, available at http://web.archive.org/web/20120423192355/http://itunes.apple.com/app/gotime/id463305124?.
(Continued)

*Primary Examiner* — Wayne Cai
(74) *Attorney, Agent, or Firm* — Gianni Minutoli; Page Ponsford; DLA Piper LLP US

(57) ABSTRACT

A method of conserving power for a navigation application of a device is provided. The method determines a time for timely departure to an event that is stored in a calendar application of the device. The time for timely departure is determined based on the starting time of the event and an estimated travel time from the current location of the device to the location of the event. The method provides the time for timely departure to the calendar application. The method calculates the time for providing an update to the time for timely departure based on the remaining time before the time for timely departure. The method hibernates the navigation application until the time for providing the update. The method repeats the determining, providing, calculating, and hibernating several times.

24 Claims, 21 Drawing Sheets

(51) Int. Cl.
  *G06Q 10/10*   (2012.01)
  *H04W 4/04*    (2009.01)
  *G01C 21/20*   (2006.01)
  *H04L 29/08*   (2006.01)
  *H04W 4/02*    (2009.01)
  *G06F 1/32*    (2006.01)
  *H04W 52/02*   (2009.01)

(52) U.S. Cl.
  CPC .... *G06F 17/3087* (2013.01); *G06F 17/30241* (2013.01); *G06Q 10/109* (2013.01); *G06Q 10/1095* (2013.01); *H04L 67/18* (2013.01); *H04W 4/025* (2013.01); *H04W 4/046* (2013.01); *H04W 52/0229* (2013.01)

(58) Field of Classification Search
  CPC ...... G06Q 10/109; G01C 21/20; H04L 67/18; H04W 4/025; H04W 4/046
  USPC .......... 455/456.1–456.3, 457; 701/410, 465, 701/527, 537, 533
  See application file for complete search history.

(56) References Cited

U.S. PATENT DOCUMENTS

| | | |
|---|---|---|
| 2010/0094529 A1 | 4/2010 | Gupta et al. |
| 2010/0175001 A1 | 7/2010 | Lazarus et al. |
| 2010/0179750 A1 | 7/2010 | Gum |
| 2010/0228574 A1 | 9/2010 | Mundinger et al. |
| 2010/0291950 A1 | 11/2010 | Lin et al. |
| 2011/0077853 A1 | 3/2011 | Ranford et al. |
| 2011/0130958 A1 | 6/2011 | Stahl et al. |
| 2012/0136572 A1 | 5/2012 | Norton |
| 2013/0238857 A1 | 9/2013 | Daniel et al. |
| 2014/0163882 A1 | 6/2014 | Stahl et al. |
| 2014/0243021 A1 | 8/2014 | Lerenc |

OTHER PUBLICATIONS

International Search Report and Written Opinion of PCT/US2016/035924, Aug. 17, 2016 (mailing date), Apple Inc.

POWER SAVING TECHNIQUES FOR A NAVIGATION APPLICATION

CLAIM OF BENEFIT TO PRIOR APPLICATIONS

This application claims the benefit of U.S. Provisional Patent Application 62/172,185, filed Jun. 7, 2015. U.S. Provisional Patent Application 62/172,185 is incorporated herein by reference.

BACKGROUND

Calendar applications are widely used in electronic devices to keep track of appointments. A calendar provides a visual representation of one or more periods of time, such as years, months, weeks, days and hours.

Many of today's electronic devices such tablets, smart phones, laptops, and desktops provide calendar applications. Calendars across different devices of one or more users can be synchronized. The users can schedule events on their calendars and request to be informed of an upcoming event at the start of the event or at fixed time intervals prior to the start of the event. Users can also request the calendar notifications to be displayed again, e.g., by selecting a snooze button.

As these calendar applications become more ubiquitous, providing additional features and further improvements to the applications are desired. The additional features, however, come with an increased cost in power consumption. As many of today's electronic devices are portable devices it is desirable to make different applications on these devices operate in power efficient modes.

BRIEF SUMMARY

Some embodiments provide a novel method for identifying location of events in a device calendar and provide alerts for time to leave in order to get to the event on time. The time to leave alert is provided when there is a high confidence of getting to the event on time.

Events in a calendar in some embodiments are either manually entered or automatically harvested from information provided in invitations, emails, text messages, etc. When an event is associated with an address, the address is revolved to an unambiguous address that uniquely identifies the location of the event. The calendar application receives a handle that uniquely identifies the event location. The location handle in some embodiments is a binary large object that is stored by the calendar application. The content of the location handle in some embodiments is opaque to the calendar application and the calendar application does not use the individual data items in the handle. Instead, the calendar application passes the handle to other applications and services in order to provide the location of an event to these applications and services. For instance, calendar application passes the location handle to a navigation daemon prior to start of an event and requests live travel updates such as time to leave to be on time, traffic reports, etc.

When the calendar application requests to receive travel updates for an event, the navigation daemon provides several updates for a duration of time from receiving the calendar application's request up to a time when the device reaches the event location or up to the time that the event ends. The travel updates require utilizing power consuming tasks for determining the current location of the device, setting a route to the event location, accessing different databases, utilizing the network resources, etc.

The navigation application in some embodiments implements several novel power saving techniques for generating time to leave and other data items for an event. The power saving techniques include using an efficient method for estimating the time for providing the next travel update. The power saving techniques also include requesting for a less precise location (e.g., a location that is determined using WiFi rather than GPS), sharing location and route information with other applications, and hibernating using a flexible timer to wake up to provide the next update. The flexible timer allows the device to synchronize the wake up of several applications that need the same resources (e.g., location determination, route determination, network requests) and/or the same data items (e.g., current location of the device, current route of the device) at the same time in order to save power.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed. For instance, many of the figures in this application are described with respect to a particular number of devices for the purposes of simplicity and/or explanation. One of ordinary skill in the art will realize the invention is not limited to the number of devices illustrated in these figures and that the invention may be practiced with any number of different devices.

In some embodiments, the mobile device is a smartphone, a tablet computer, or a laptop with location identification, mapping, routing, and calendar services. A calendar application on the device maintains a list of the upcoming appointments and events. The address strings that are associated with events (or appointments) are resolved to a set of location data items that uniquely identify the location of an event. The calendar application provides the unique address to a navigation application and requests to receive live travel updates such as the estimated travel time from the current location of the device to the event location and/or the time to depart in order to get to the event on time. The navigation application in some embodiments provides additional live information such as whether the device user is late for getting to an event, current traffic conditions, incidents along the route, etc.

Figure 1:
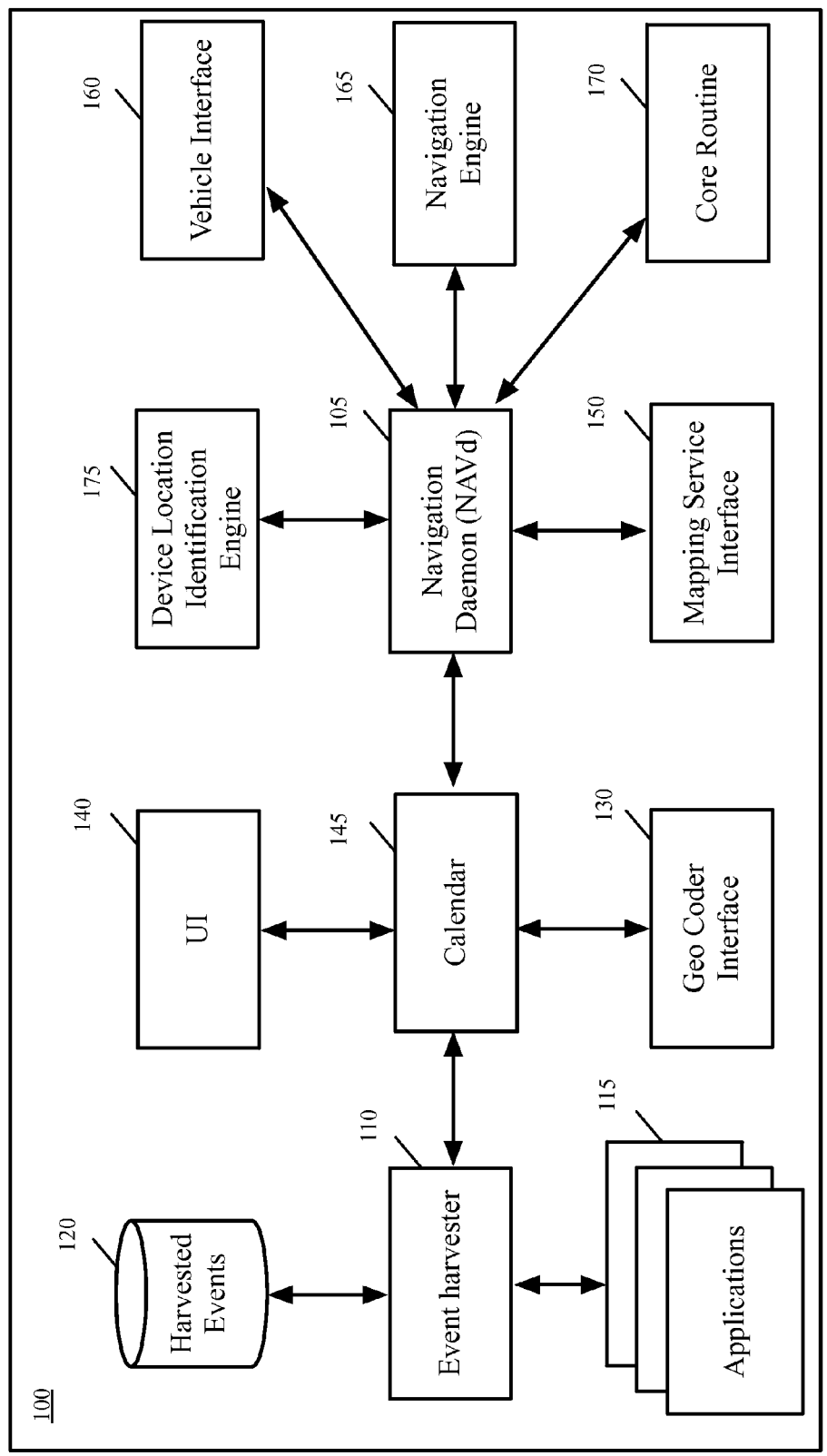
FIG. 1 conceptually illustrates an example of a mobile device with calendar and navigation applications in some embodiments.

FIG. 1 conceptually illustrates an example of a mobile device 100 with such services in some embodiments. An example of a mobile device is a smart phone, touchpad, laptop, personal digital assistant (PDA) device, etc. As shown, device 100 includes a calendar application 145, an event harvester 110, a geo coder interface 130, a user interface (UI) 140, a mapping service interface 150, a navigation engine 165, a navigation daemon 105, a vehicle interface 160, a core routine 170, a device location identification engine 175, and a set of applications 115 such as electronic mail (email) applications, text messaging applications, etc. In addition, the device includes a harvested events storage (e.g., a database) 120. Other components of the device are not shown for simplicity.

Calendar application 145 provides a visual representation of one or more periods of time, such as years, months, weeks, days and hours. The calendar application allows the device to maintain a list of events for different appointments, meetings, reminders, event, etc. Each one of these appointments, meetings, reminder, events, etc., that are maintained by the calendar application is referred herein as an "event." Events in the calendar in some embodiments are either manually entered through the UI 140 or automatically detected by the event harvester 110. The event harvester 110 harvests events from content supplied by one or more applications 115. The harvested events are stored in harvested events storage 120. In some embodiments, the event harvester enters the harvested events in the calendar. In other embodiments, the calendar application retrieves the harvested events from event harvester 110 and/or harvested events storage 120.

Many events are associated with addresses. For instance, the address harvester may have identified an email with a message that includes an invitation to have dinner in a restaurant. The message may also include the time and date, as well as the name and the city where the restaurant is located. The event harvester identifies the address associated with the events and stores the addresses either in the harvested event storage 120 or in a separate harvested address storage (not shown).

The addresses associated with an event may be incomplete or ambiguous. The calendar application 145 sends the event addresses to a geo coder interface 130. The geo coder interface request a geo coder service (e.g., an external set of one or more servers) to determine whether the address can be unambiguously resolved. For the addresses that can be unambiguously resolved to a unique location, the geo coder interface receives a set of data items from the geo coder. The geo coder interface 130 extracts relevant information about the event location and passes the information in a location handle to the calendar.

The location handle in some embodiments is a binary large object that is stored by the calendar application. The content of the location handle in some embodiments is opaque to the calendar application and the calendar application does not use the individual data items in the handle. Instead, the calendar application passes the handle to other applications and services to identify the location of an event. For instance, calendar application 145 passes the location handle to navigation daemon 105 prior to start of an event and requests live travel updates such as one or more of the estimated travel time, estimated time to depart, traffic reports, etc.

The navigation daemon 105 interacts with other applications and services on the device such as mapping service interface 150, vehicle interface 160, device location identification engine 175, and navigation engine 165 to set a route to the event location, receive traffic and incident report, estimated travel time, etc. Navigation daemon generates a report (referred to as a hypothesis) for the estimated travel time and optionally traffic and incident reports. In some embodiments, calendar application subscribes (or registers) to be informed when navigation daemon generates reports related to an event location. For instance, the calendar application utilizes an application programming interface (API) that is used for inter-process communication to request travel updates for an event and receive the event hypothesis from the navigation daemon. The navigation daemon generates several of these reports for the duration of the event. The reports are provided in intervals that are dynamically determined based on the amount of time left to the start of the event, traffic conditions, etc. In some embodiments, any other application that requests to receive these updates can register to receive the updates from the navigation daemon.

The mapping service interface 150 in some embodiments receives route information as well as other information such as traffic congestion data, incident data, road closure data, and weather report from a set of external servers such as one or more map service servers. In some embodiments, the route generation is a routing engine that executes on the device 100 to produce the routes. In other embodiments, mapping service interface 150 uses a route generator on one or more servers connected to the device to generate the route.

Different embodiments use different location identification engines 175. In some embodiments, this engine includes a global positioning system (GPS) engine that uses GPS data to identify the current location of the device. In some of these embodiments, this engine augments the GPS data with other terrestrial tracking data, such as triangulated cellular tower data, triangulated radio tower data, and correlations to known access points (e.g., cell-ID, Wi-Fi ID/network ID), in order to improve the accuracy of the identified location. In addition, some embodiments use one or more of the types of terrestrial tracking data without GPS data.

In some embodiments, an application that requests the device location specifies the level of precision required for the device location (e.g., high, medium, or low precision). Device location identification engine 175 utilizes the required level of precision to optimize the power consumption. For instance, in order to save power and processing resources, the navigation daemon requests for a low precision estimate of the device location to calculate the travel time to an event location. When the required precision level is low, the device location identification engine 175 may use a WiFi location determination method that requires less power and has lower precision than GPS. In some embodiments, device location identification engine 175 coalesces requests for device location from several applications on the device. In these embodiments, if the higher precision GPS positioning is already performed for another application, the same location data is also provided to other applications and services such as the navigation daemon. Otherwise, a low precision, low power consuming method (such as WiFi) is used to determine the device location.

Navigation engine 165 provides turn-by-turn navigational directions when the device is navigating from one location to another. Navigation engine 165 in some embodiments generates the navigation instructions internally. In other embodiments, navigation engine 165 receives these instructions from a set of one or more external servers.

Vehicle interface 160 interacts with different systems in a vehicle and is utilized by navigation daemon 105 to determine whether the device is inside a vehicle. As described further below, a portion of travel time to an event includes walking to a parked vehicle. Once navigation engine 165 determines that the device is interacting with a vehicle, navigation daemon 105 infers that the device user has already finished walking to the vehicle. In addition, navigation daemon 105 in some embodiments utilizes the device's interactions with the car to ascertain that the device user has left for an event.

Navigation daemon 105 also interacts with core routine 170 to receive destination prediction. Core routine 170 utilizes historical data from the device's (or the device user's) previous travels and makes a static prediction for the next destination that the device may be heading. Navigation daemon utilizes the core routine's static prediction as one of several factors to generate a live destination prediction that is based on factors such as whether the device is actively navigating to a destination, travelling along a certain route, or moving towards an event specified in the calendar. Navigation daemon in some embodiments weights the destination predication received from the core routine, a destination currently being navigated to (if any) by the navigation engine, events in the calendar, and interactions with a vehicle to come up with a live destination prediction. Details of these embodiments and several more embodiments are described below.

Several more detailed embodiments of the invention are described in the sections below. Section I conceptually describes determining location of calendar events according to some embodiments of the invention. Next, Section II describes interactions between the calendar application and the navigation daemon to generate time to leave alerts for upcoming events according to some embodiments of the invention. Next, Section III describes details of power saving techniques utilized by the navigation daemon according to some embodiments of the invention. Finally, Section IV describes an electronic system that implements some embodiments of the invention.

I. Determining Location of Calendar Events

Events in a calendar are often associated with an address. The addresses may refer to a partial address, a business or location name, or otherwise be ambiguous. The calendar application resolves these addresses (e.g., by using a geo coder service) to uniquely identified locations. Some time prior to the start of an event that is associated with a uniquely identified location, the calendar application sends the event location to a navigation service and requests to receive periodic estimates for time to leave for being on time, travel time to the event, as well as other travel related information such as traffic conditions and incident reports along the route to the event.

Upon receiving the periodic updates, the calendar application uses different heuristics to generate alerts at different times to inform the device user the time to leave in order to get to the event on time as well as alerts to inform the user that he/she is already late for getting to the event. Unlike the prior art that generates calendar alerts at fixed time intervals prior to or after an event, the calendar application in some embodiments receives live travel time updates that depend on the distance to the event, traffic and weather conditions, incidents, etc.

Figure 2:
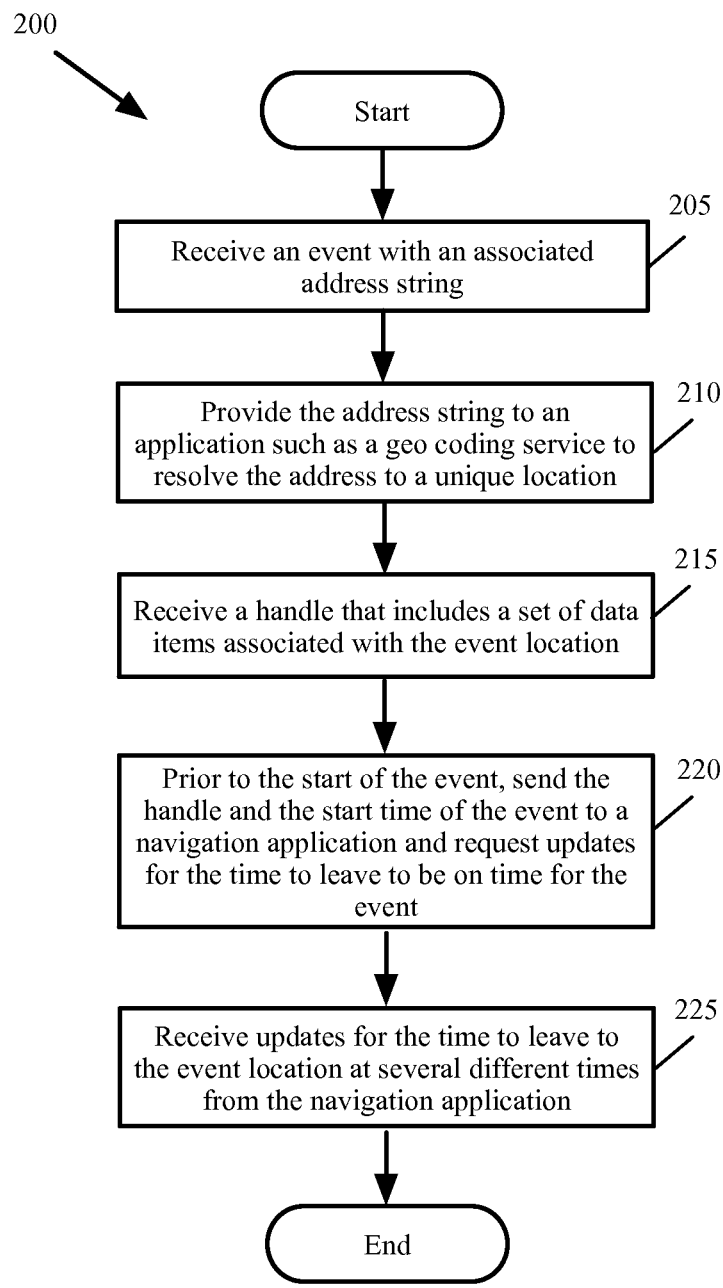
FIG. 2 conceptually illustrates a process for generating time to leave alerts by a calendar application of a device in some embodiments.

FIG. 2 conceptually illustrates a process 200 for generating time to leave alerts by a calendar application of a device in some embodiments. As shown, the process receives (at 205) an event with an associated address string. For instance, the event is an automatically harvested event, a manually entered event, or an invitation that is accepted by the device user.

The process then provides (at 210) the address string associated with the event to a service such as a geo coder to uniquely identify the event location. The process then receives (at 215) a handle to a set of data items associated with the event location. The process, prior to the start of the event, sends (at 220) the location handle and the start time of the event to a navigation service and requests updates for the time to leave and/or estimated travel time to the event.

The process then receives (at 225) updates of the time to leave and/or estimated travel time to the event location at several different times from the navigation application. The process then ends. Details of different operations of process 200 are provided further below.

A. Harvesting of Events

Figure 3:
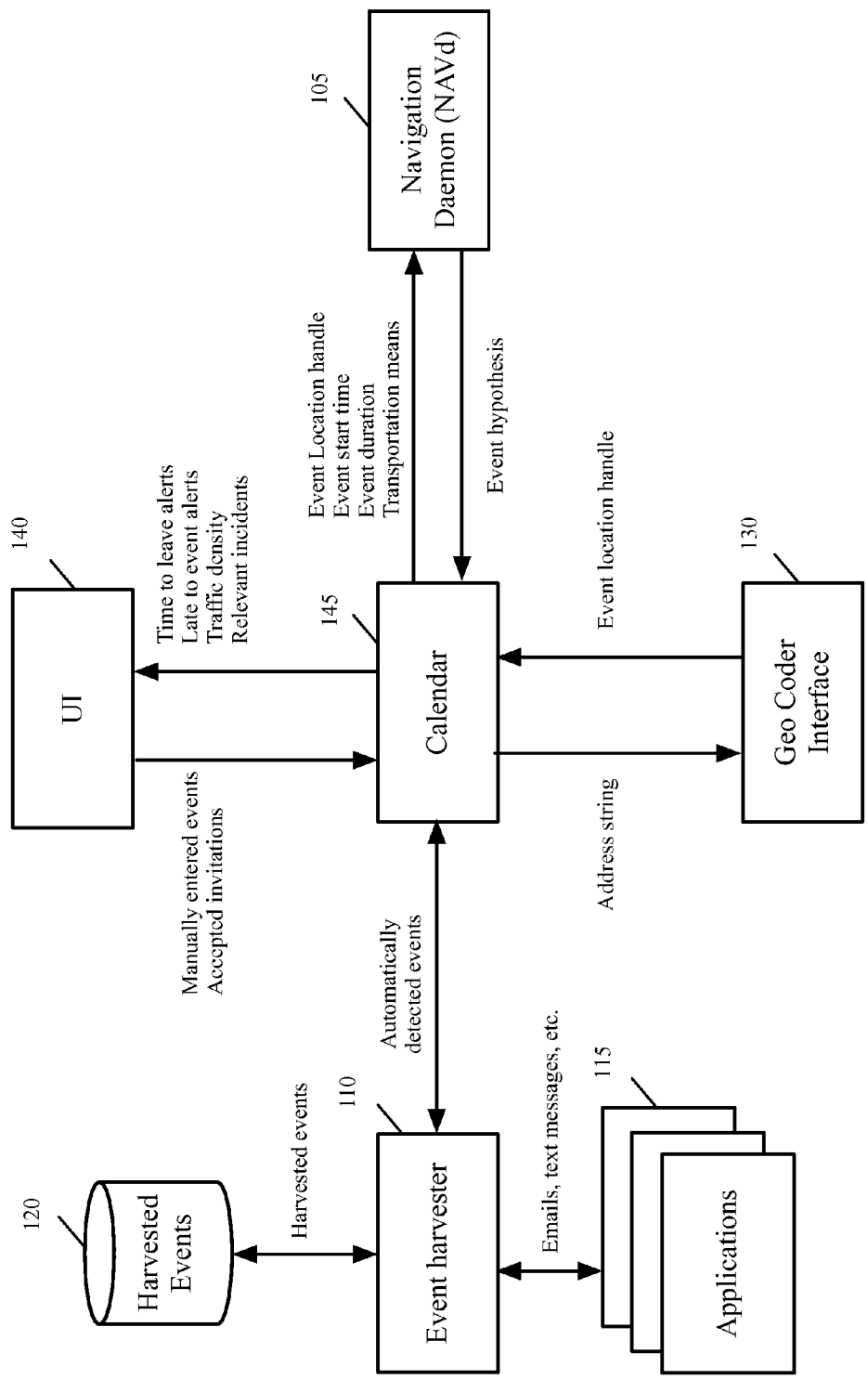
FIG. 3 conceptually illustrates interactions of a calendar application with other applications and services of a device in some embodiments of the invention.

FIG. 3 conceptually illustrates interactions of a calendar application with other applications and services of a device in some embodiments of the invention. As shown, calendar application 145 receives events from different sources. The device user manually enters events (e.g., appointments, meetings, reminder, events, etc.) through the device UI 140. The device user also accepts invitations through the calendar from other people. Some of these appointments and events are also synchronized through other devices.

Event harvester 110 harvests events and stores these addresses in the harvested address data storage 120. The event harvester captures events differently in different embodiments. For instance, the event harvester in some embodiments receives telecom messages (e.g., email messages, text messages, etc.) from one or more applications 115 (e.g., email applications, text messaging applications, etc.), analyzes these messages, extracts any events that it finds in these messages, and stores the events data (e.g., name, location, time, and/or participants of the event) in the harvested events data storage 120.

Applications 115 in some embodiments only supply the received telecom messages to the harvester 110. In other embodiments, applications 115 only supply the transmitted telecom messages to the harvester 110. In still other embodiments, applications 115 supply both the sent and received telecom messages to the harvester 110.

In addition to such events, the harvester 110 also stores the addresses specified for events by scheduling applications. Specifically, the harvester 110 in some embodiments directly receives events and addresses to harvest from scheduling applications (e.g., another device's calendar, an electronic ticketing application, an online invitation application, etc.). For instance, when the electronic ticketing application of some embodiments has tickets for an event, it supplies the event data items to the event harvester 110 for storing in the harvested events storage 120. In some embodiments, event harvester 110 provides the harvested events to the calendar application 145. In other embodiments, the calendar application retrieves the events from the event harvester and/or the harvested events storage 120.

The calendar application in some embodiments differentiates between the events that are entered or explicitly accepted by a human (i.e., the device user) and the automatically harvested events. For instance, the automatically harvested events in some embodiments are displayed in a different color and/or are not synchronized to other devices until the user promotes the events.

Figure 4:
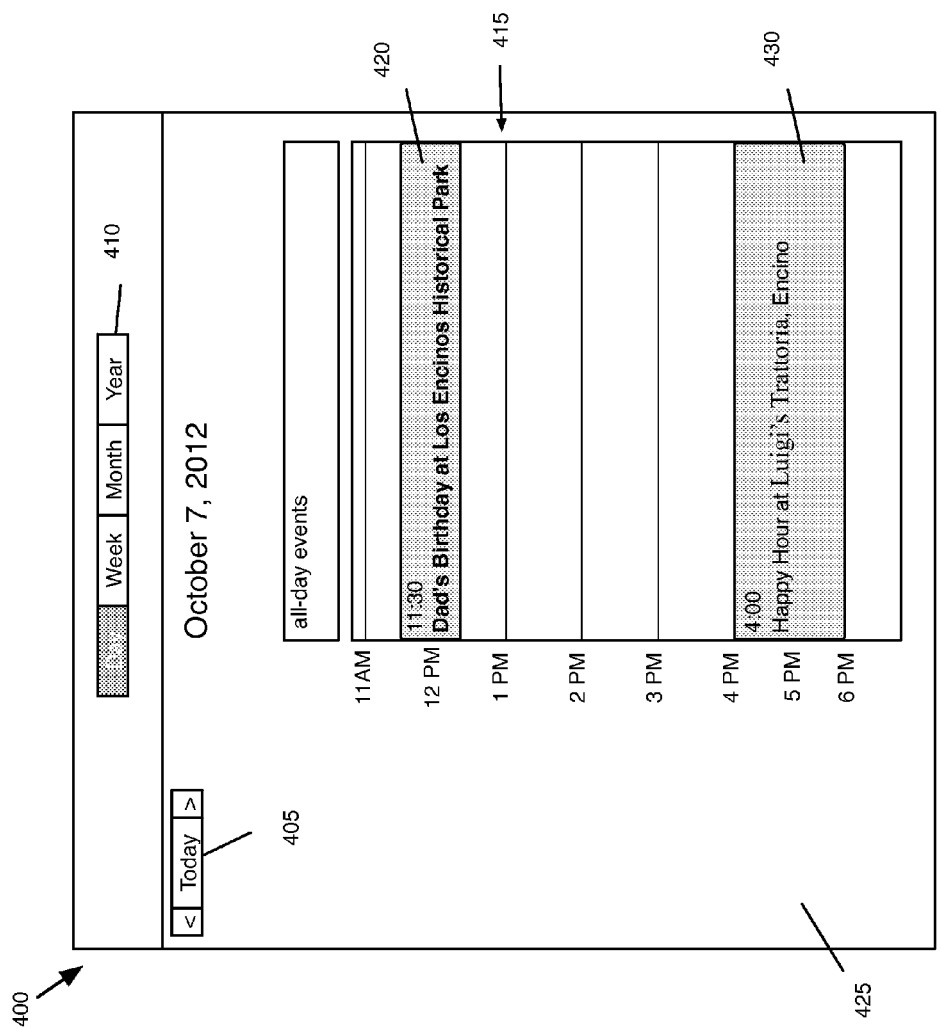
FIG. 4 conceptually illustrates a daily view of a calendar that includes manually entered appointments as well as automatically detected events in some embodiments.

FIG. 4 conceptually illustrates a daily view of a calendar that includes manually entered or accepted appointments as well as automatically detected events in some embodiments. Many calendar applications allow the users to view their appointments according to different temporal layouts, such as a monthly layout, a weekly layout, a daily layout, etc. Each of these views, or layouts, provides a different level of detail for different ranges of time. As shown in this figure, the GUI 400 includes a calendar view selector 410, a date selector 405, and a calendar display area 425.

In the example illustrated in FIG. 4, the daily calendar layout 400 includes two appointment items (or events) 420 and 430. Appointment item 420 is manually entered by the device user while appointment item 430 is an automatically harvested event. Appointment item 430 (which is not confirmed by the user) has a different visual appearance (e.g., is shown with different font, different color, different shading) than appointment item 420 to distinguish appointment item 430 as an automatically harvested event.

Some embodiments do not synchronize the automatically harvested events among a user's different devices until the user promotes the events. For instance, the user in some embodiments is prompted to determine whether to keep such those events and/or to synchronize them among different devices. In some embodiments, the calendar UI 400 provides tool for the user to disable time to leave alerts for individual events, for a category of events (e.g., automatically harvested events), or all events. The UI in some embodiments also provides tools to delete some or all automatically harvested events or disable (temporarily or permanently) automatic event harvesting.

B. Converting Ambiguous Addresses to Unambiguous Canonical Form

As shown in FIG. 4, the appointments 420 and 430 have associated locations "Los Encinos Historical Park" and "Luigi's Trattoria, Encino," respectively. The two addresses, however, identify location names and could be ambiguous. For instance, there could be multiple parks called "Los Encinos Historical Park" or multiple restaurants named "Luigi's Trattoria." As shown in FIG. 3, calendar application 145 sends address strings associates with event locations to a service such as a geo coder through the geo coder interface 130 to resolve the event locations to unambiguous, uniquely identified locations. The geo coder is a service that uses different heuristics to resolve the addresses. For instance, there could be only one restaurant named "Luigi's Trattoria" in city of Encino. Similarly, there could be only one park named "Los Encinos Historical Park" in a predetermined geographical area around the current location of the device or only one park in a database that stores the name of parks. Such a unique location is referred to as a canonical address in some embodiments. The canonical address uniquely identifies the location from other locations.

Figure 5:
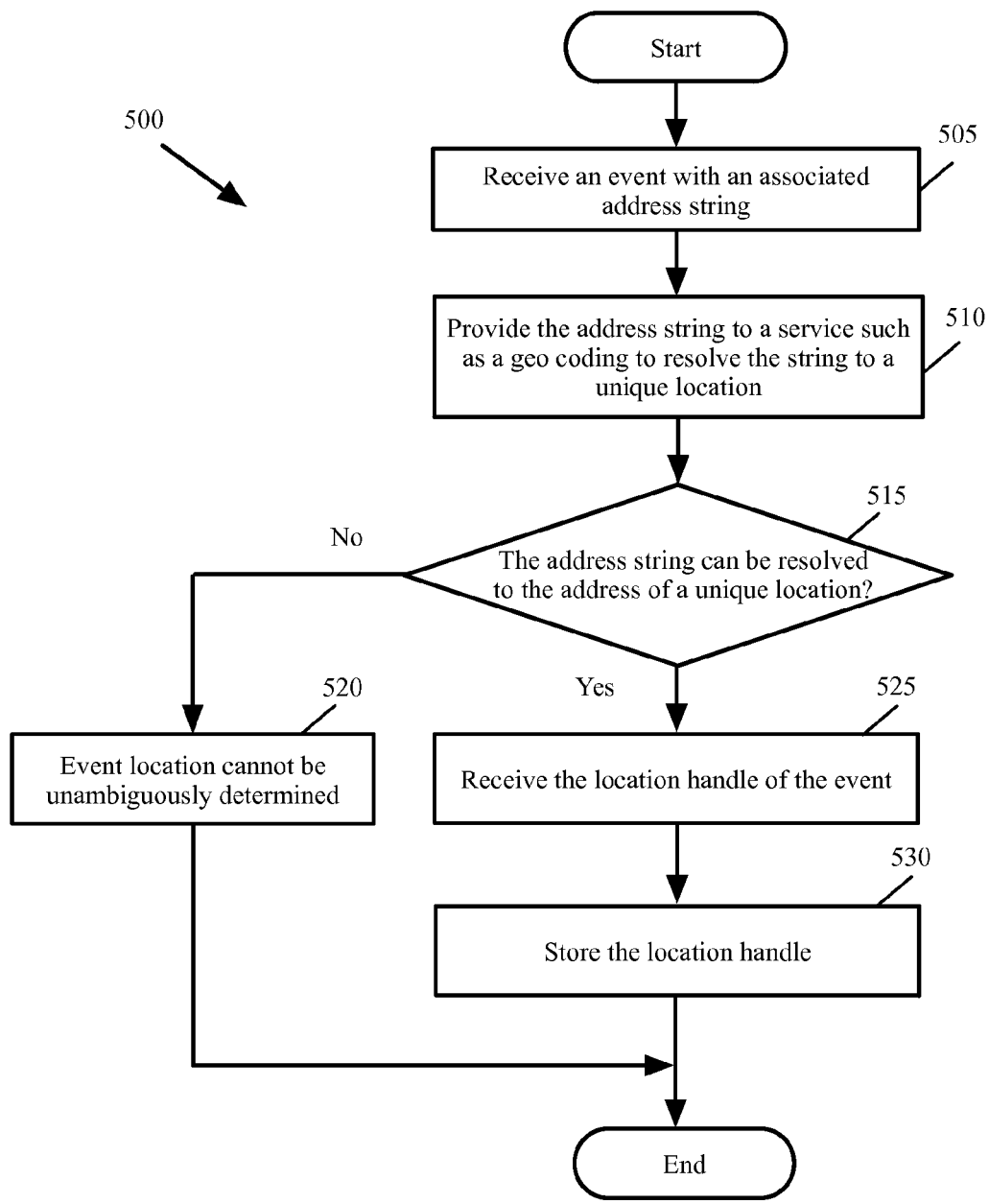
FIG. 5 conceptually illustrates a process performed by the calendar application to resolve location addresses in some embodiments.

FIG. 5 conceptually illustrates a process 500 performed by the calendar application to resolve location addresses in some embodiments. As shown, the process receives (at 505) an event with an associated address string. The process then provides (at 510) the address string associated with the event to a service such as a geo coder to resolve the address string to a unique location. The process determines (at 515) whether the address string can be resolved to the address of a unique location. In some embodiments, the geo coder only returns a location if it can unambiguously resolve an address string to a unique location. For instance, if the address string is 100 main street, the geo coder may find many matches for the address. On the other hand, 100 Main Street, San Mateo can be resolved to a unique location.

If the geo coder does not return a location, the process determines (at 520) that the address cannot be uniquely resolved. Otherwise, the process receives (at 525) the handle for the event location (e.g., as shown in FIG. 3). The process stores (at 530) the handle for the event location. The process then ends.

In some embodiments, the resolved address of an event that is returned by the geo coder includes many different data items. Some of these data items may not be used by the calendar application. Other data items may change during the pendency of an event. In some embodiments, the calendar application receives two sets of data items. One set of data items is an opaque event location handle. The event location handle in some embodiments is a binary large object (blob) that includes data items needed by other applications and services to provide event related reports for the calendar application.

For instance, navigation daemon receives the event location handle from the calendar application and extracts location data items that are needed by the navigation daemon (or the services that navigation daemon uses) to generate travel updates for the event. In other words, the geo coder interface 130 includes data items in the location handle that are needed by services external to the calendar application. Calendar application stores the handle for the purpose of sending the handle to other applications. Calendar application sends the handle to services such as navigation daemon to request travel updates to the event location. The content of the location handle in some embodiments is opaque to the calendar application and the individual data items in the location handle are not individually used and/or are in a format that is not known or usable by the calendar application. On the other hand, individual location data items that are needed by the calendar application are sent by the geo coder interface 130 to the calendar application 145 separate from the location handle.

Figure 6:
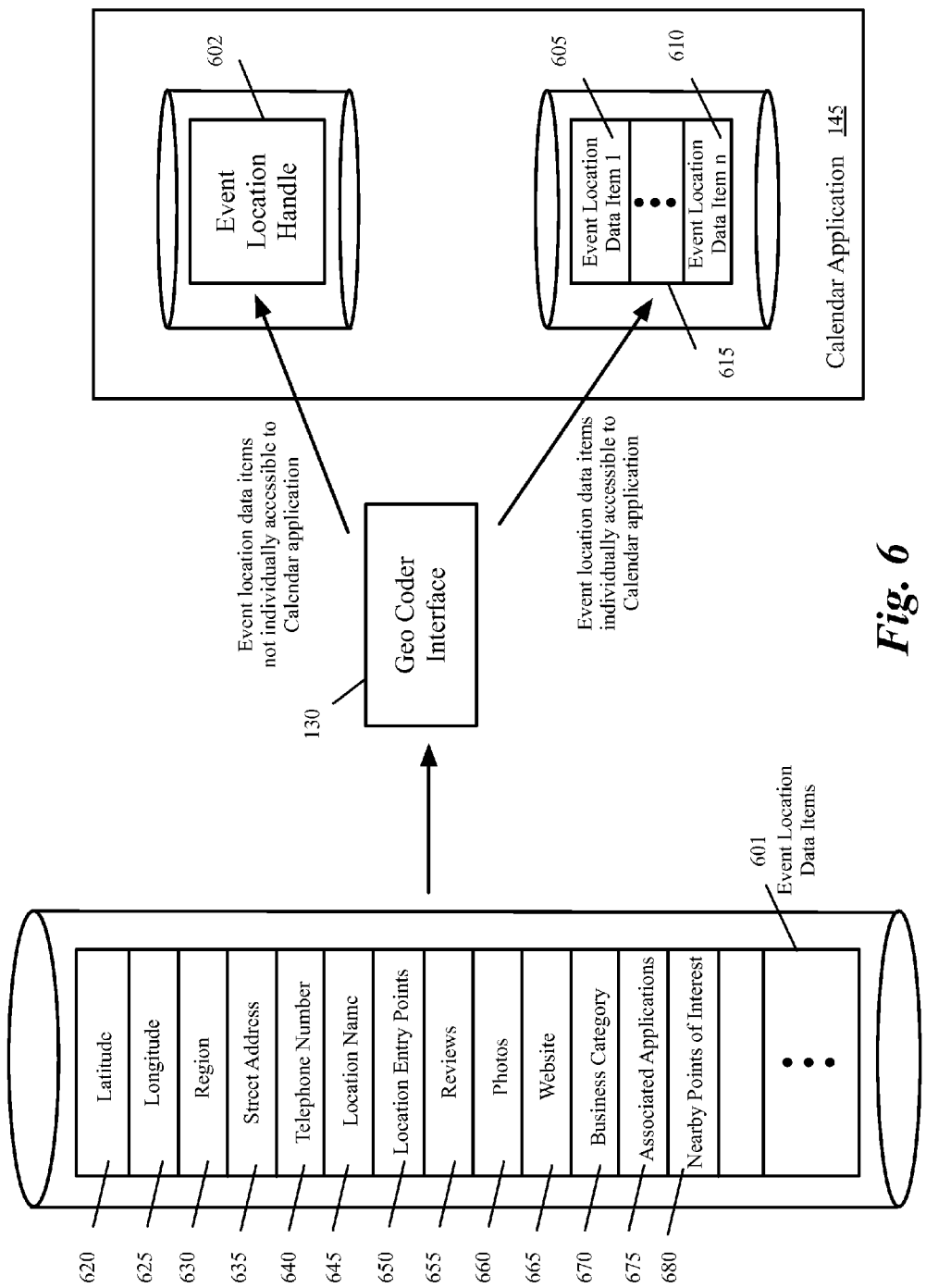
FIG. 6 conceptually illustrates an example of the data items of an event location that are received from a geo coder and the associated location handle that is sent to the calendar application in some embodiments.

FIG. 6 conceptually illustrates an example of the data items of an event location that are received from a geo coder and the associated location handle that is sent to the calendar application. As shown, the location data items 601 include geographical coordinates, i.e., latitude 620 and longitude 625 of the event location. The data items also include one or more of the followings: a region 630 (e.g., the center coordinate and the radius of a circle that encloses the event location or a larger area that includes the event location), street address of the event location 635, one or more telephone numbers 640 associated with the location, location name 645, location entry points 650 (e.g., different entry points to a large building, a park, an stadium, etc.), reviews 655 provided for the location at different social websites or by different people, one or more photos 660 of the event location or nearby location, links to one or more websites 665 associated with the location, a business category 670 for the location, a set of applications 675 that users can use at the location (e.g., to download coupons to get discount), a set of points of interest 680 in the vicinity of the location, etc.

Many of these data items such as reviews 655, websites 665, telephone numbers 640, photos 660, or associated applications 675 may change or get updated during the pendency of an event. In addition, calendar application or the services used by the calendar application may not need most of these data items. Since calendar items are often synchronized among different devices of a user, synchronizing a large set of data items among different devices can be time consuming. In addition, if calendar stores all data items 601 associated with an event, the information becomes obsolete once there is an update.

In some embodiments, the calendar application only receives a location handle 602 that includes a minimal subset of the location data items that are needed by applications and services external to the calendar application to provide location based services for events in the calendar. Calendar application stores the location handle and sends it to these applications and services (e.g., to navigation daemon) to get reports and travel updates related to the event location. The address handle in some embodiments is a data structure such as a blob and the data items included in the blob are not individually used by the calendar application (or the blob is in a format that is not known by the calendar application). In other words, geo coder interface 130 knows what data items are needed by navigation daemon or other applications that provide location based services to the calendar application and inserts those data items in the location handle blob. The location blob is stored by the calendar application and is sent, e.g., to navigation daemon when the calendar application requires travel updates to the location.

The content of the handle depends on the data items required by the applications such as navigation daemon to provide location based services for the calendar application. The content of the handle in some embodiments includes data items such as latitude 620, longitude 625, and region 630. If calendar application requires any of the event location data items 601 for the calendar application's internal use, the individual data items are sent from the geo coder interface 130 to the calendar application separate from the event handle location.

As shown in FIG. 6, calendar application 145 receives two sets of data items. One set of data items is included in the event location handle 602, which is opaque to the calendar application. Calendar application stores the event location handle 602 for the purpose of sending it to navigation daemon when travel updates to the event location are needed. The other set of data items 605-610 are data items that calendar application 145 needs to individually access. These data items 605-610 may or may not have overlap with the data items in the event location handle. For instance, both the event location handle 602 and the data items 615 may include latitude, longitude, and region data items.

The data items included in the event location handle are opaque to and not individually used by the calendar application while data items 605-610 are used by the calendar application. As an example, calendar application in some embodiments stores the latitude and longitude for compatibility purposes to synchronize the data with devices that do not have a service similar to navigation daemon (e.g., another one of the user's devices that has an older version of the operating system). As another example, another one of the user's devices may delete the location handle. In this case, the latitude and longitude that are stored separately can be used to set a route to event location.

II. Providing Time to Leave Alerts

For the events that have an unambiguous location, the calendar application provides time to leave alerts to ensure the device user leaves the current location of the device to get to the event on time. Referring back to FIG. 3, calendar application 145 at a predetermined time before an event sends event data such as the location handle and event start time to navigation daemon (or service) 105 and requests time to leave estimates.

The calendar application in some embodiments also sends additional data items such as the event duration (or alternatively the event end time) and means of transportation. For instance, the calendar application in some embodiments provides a tool for the device user to specify means of transportation such as driving or walking to an event. When transportation means to an event is available, the calendar application sends that information to navigation daemon. Otherwise, navigation daemon utilizes heuristics and historical data to determine the transportation means to the event. The navigation daemon 105 determines (internally and/or by receiving data from external servers) estimated time to leave and/or travel time from the current location of the device to the event location and provides them to the calendar application. The navigation daemon provides live updates with frequencies that are dynamically determined based on different factors such as the time remaining to the start of the event, traffic conditions, weather conditions, incidents on the route, etc.

Figure 7:
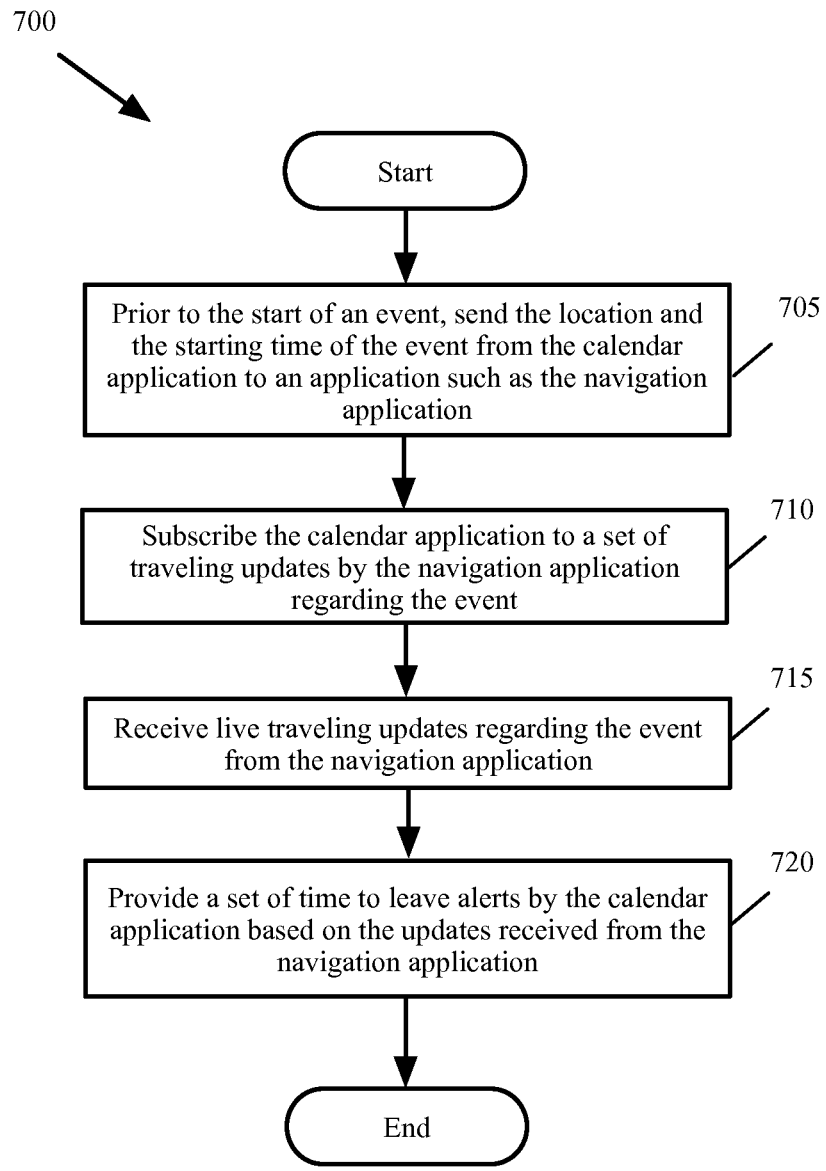
FIG. 7 conceptually illustrates a process for sending event information from the calendar application to a navigation service and receiving time to leave alerts and other travel updates from the navigation service in some embodiments.

A. Establishing a Communication Channel Between the Calendar and Navigation Applications to Determine Estimated Time to Leave for an Event FIG. 7 conceptually illustrates a process 700 for sending event information from the calendar application to a navigation service and receiving time to leave alerts and other travel updates from the navigation service in some embodiments. As shown, prior to the start of an event, the calendar application sends (at 705) the location information (e.g., the location handle) and the start time of the event to an application such as the navigation application (e.g., to a service such as navigation daemon 105 provided by the navigation application). For instance, at a predetermined time (such as 4 hours, 2 hours, 1 hour, etc.) prior to the start of an event the process sends the event information to the navigation application. The process also optionally sends the event duration (or the end time) to the navigation application. The process also optionally sends the transportation means (if known) to the navigation application.

The process then subscribes (at 710) to a set of travelling updates by the navigation application regarding the event. For instance, the calendar application in some embodiments utilizes an API that is used for inter-process communication to receive data in a data structure such as the event hypothesis from the navigation daemon (as shown in FIG. 3). In other embodiments, the calendar application gets a notification (e.g., gets waked up or receives an interrupt) when the navigation application has updated information regarding the event.

The process then receives (at 715) one or more live travel updates such as time to leave to get to the event on time and optionally alerts for being late, traffic conditions, weather conditions, incident reports, etc., from the navigation application at different times. In some embodiments, the process receives (in addition to or in lieu of the time to leave estimates) the estimated travel time from the current location of the device to the event location. In these embodiments, calendar application calculates the time to leave by subtracting the travel time from the start time of the event. The process then provides (at 720) a set of alerts (as shown in FIG. 3) to inform the device user to leave towards the event location in order to be on time for the event as well as alerts when the user is already late for the event, traffic conditions, incident reports, etc.

Figure 8:
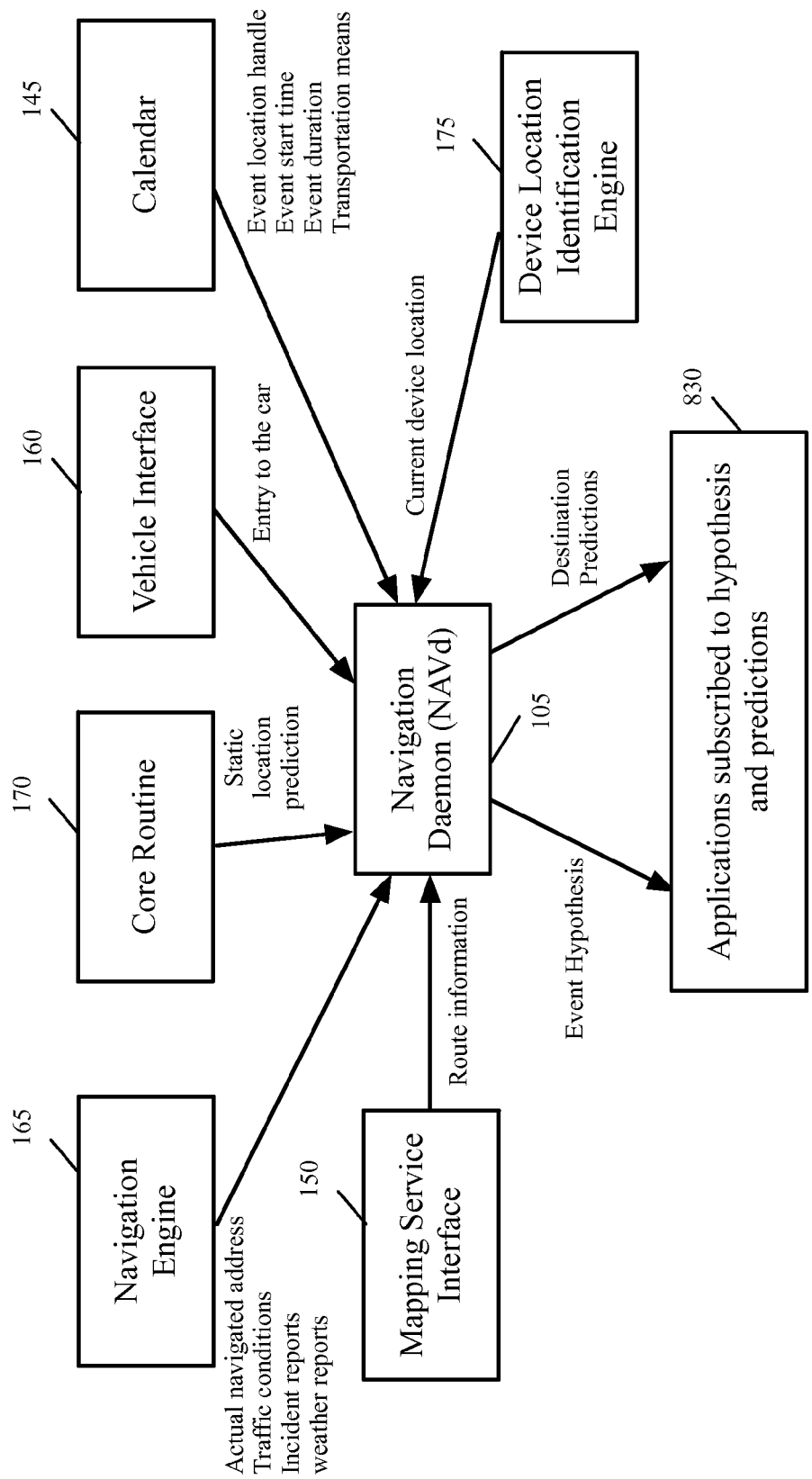
FIG. 8 conceptually illustrates a service of the navigation application that provides live travel updates for a calendar event in some embodiments.

FIG. 8 conceptually illustrates a service of the navigation application that provides live travel updates for calendar events in some embodiments. As shown, the navigation service (referred to as navigation daemon or NAVd) 105 receives data from one or more other applications such as the navigation engine 165, core routine 170, vehicle interface 160, calendar 145, mapping service interface 150, and device location identification engine 175. The navigation daemon selectively uses the information received from one or more of these applications and provides destination prediction and event hypothesis to applications 830 that are subscribed to receive the destination predications or the event hypothesis.

Core routine 170 utilizes historical data from the device's previous travels and based on the current location of the device makes a static prediction for the next destination that the device may be heading. Core routine in some embodiments does not take into account whether the device is currently moving in a particular direction. Some applications, however, may require a more precise destination predictions. These applications subscribe to destination predictions provided by the navigation daemon 105.

In addition to core routine's static destination prediction, navigation daemon 105 interacts with other applications to provide live destination predications. When the device is actively navigating towards a destination (i.e., the device user has entered a destination and has asked for navigational directions to the destination), navigation daemon 105 receives the destination information from the navigation engine 165. This destination in some embodiments supersedes any other destination predications since it is an actual destination sought by the device user.

In addition, navigation daemon 105 receives an indication from vehicle interface 160 as to whether the device is in a vehicle. Vehicle interface 160 interacts with different systems in a vehicle and is utilized by navigation daemon to determine that the device is inside a vehicle. For instance, the vehicle interface 160 in some embodiments communicates with vehicle systems through a short-range communication protocol such as Bluetooth. Such communication is used as an indication that the device is inside a vehicle and, e.g., the device user is no longer walking towards a vehicle. As described further below, a portion of travel time to an event includes walking to a parked vehicle. Once navigation engine 165 determines that the device is interacting with a vehicle, the navigation engine 165 infers that the device user has already reached the vehicle. In some embodiments, navigation daemon determines that the user of the device has obliged with the time to leave alert when the device is determined to be inside a vehicle.

Navigation daemon 105 also receives event locations from the calendar application, which is used as another factor for predicting the next destination of the device. Navigation daemon in some embodiments weights the destination predication received from the core routine, a destination that is currently being navigated to (if any) by the navigation engine, events in the calendar, interactions with a vehicle, etc., to come up with a live prediction for the current destination of the device.

As a separate service, navigation daemon 105 provides travel updates to different locations. An application such as calendar application provides event data such as location, start time, duration, and transportation means (if known) to the navigation daemon and requests travel updates to the location. The requesting application then subscribes to live travel updates to the event location provided by the navigation daemon. Navigation daemon receives the current location of the device from device location identification engine 175 in some embodiments. Navigation daemon also requests a route from the current device location to the event location from the mapping service interface 150. Navigation daemon in some embodiments also requests estimated time to leave and/or estimated travel time from the mapping service interface. In some embodiments, the navigation daemon specifies a percentage of confidence for calculating time to leave in order to have a high percentage of the users (e.g., 80%, 90%, 95%, etc.) to be on time to the event. In other embodiments, a server that estimates the time to leave or the travel time to an event is programmed to provide such high confidence estimates. The mapping service interface 150 sends the route request and request for time to leave and/or travel time to a set of external servers and provides the response to the navigation daemon. Navigation daemon in some embodiments further updates the estimated time to leave based on other information such as current traffic conditions and any incidents along a route from the current device location to the location of the event.

Navigation daemon then provides time to leave to calendar application 145. The navigation engine 165 provides (e.g., through one or more external servers) traffic conditions, weather condition, road closure reports, incidents/accidents reports, etc., to the navigation daemon 105. Navigation daemon 105 stores time to leave and other optional data items such as traffic information, weather information, road closures, traffic incidents, etc., in a data structure referred to herein as a hypothesis. Navigation daemon provides the hypothesis to applications (such as calendar application) that have subscribed to receive travel updates for the event.

Figure 9:
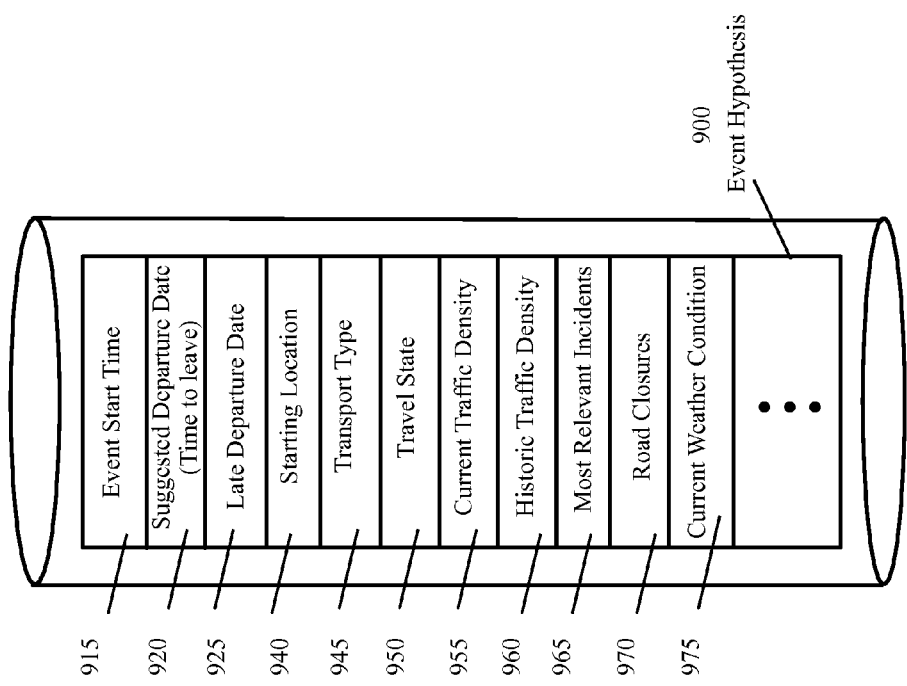
FIG. 9 conceptually illustrates a hypothesis data structure in some embodiments.

FIG. 9 conceptually illustrates a hypothesis data structure (or object) in some embodiments. As shown, the event hypothesis 900 includes several data items 915-975. Event start time 915 is the start time of the event being monitored by the navigation daemon. Suggested departure date (or time to leave) 920 is the suggested date and time to leave that provides a predetermined level of confidence to get most of the users to the event on time. Suggested departure time is the difference between the event start time 915 and the estimated travel time from the current location of the device (starting location 940) to the event location.

When the transportation means is driving, some embodiments consider additional factors beside the driving time to calculate the travel time. For instance, some embodiments consider the time that takes for the device user to walk to a parked vehicle as well as the time to park the vehicle at the destination and the time to walk to the event. In addition, the navigation daemon in some embodiments adjusts time to leave received from external servers to consider current traffic and incident conditions.

B. Determining Total Travel Time to an Event

Figure 10:
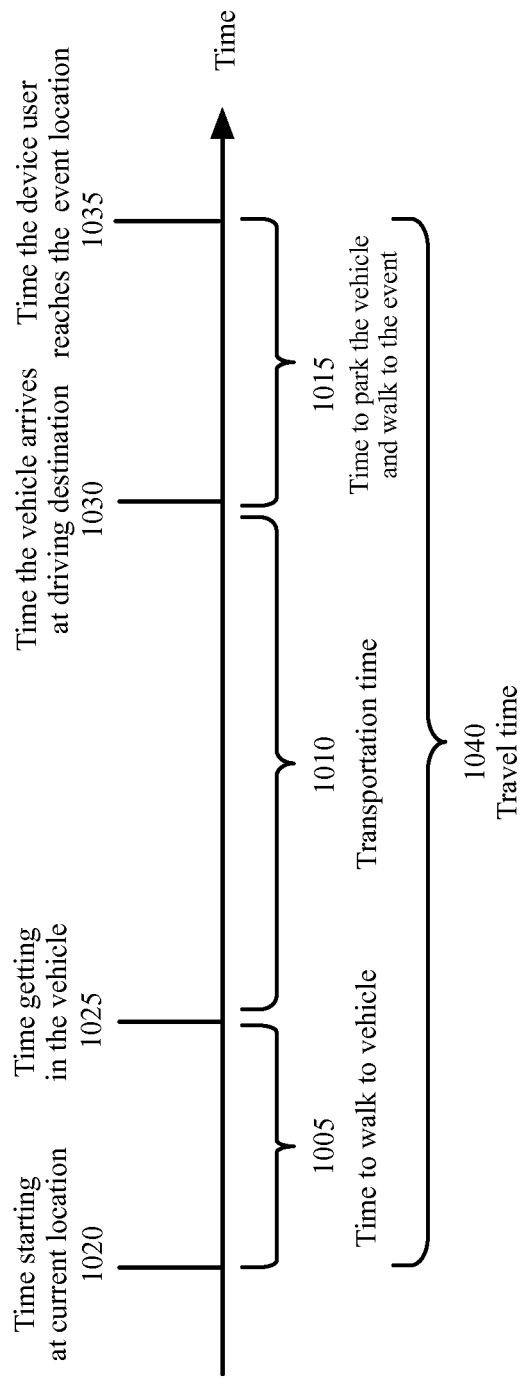
FIG. 10 conceptually illustrates different portions of the estimated travel time from the current location of a device to the location of an event in some embodiments.

FIG. 10 conceptually illustrates different portions of the estimated travel time from the current location of a device to the location of an event in some embodiments. As shown, the travel time 1040 includes three parts. The first part is the time 1005 to walk to a vehicle, which starts from the time 1020 that the device user starts at the current device location until the time 1025 the device reaches a vehicle.

The next part of travel time 1040 is the transportation (or driving) time 1010, which is from the time 1025 the device user reaches a vehicle until the time 1030 the vehicle arrives at the driving destination. The last part of travel time 1040 is the time 1015 to park the vehicle and walk to the event, which is the from the time 1030 the vehicle arrives at the driving destination to the time 1035 the device reaches (e.g., the device user walks into) the event location.

The travel time 1040 in some embodiment is estimated such that it provides a majority of users to an event on time. Instead of calculating the average time or the median time to travel (the number separating the higher half of the data sample, population, or distribution of the time to travel, from the lower half) from the current device location to the event location, navigation daemon provides a travel time that guarantees a higher percentage than average (e.g., 95% chance) that the users get to the event on time. The travel time with a predetermined high percentage of confidence to get the users to an event on time considers the drivers (or walkers) that drive (or walk) slower than average as well as additional time to find parking and walk to the event location.

In addition, navigation daemon in some embodiments provides a late departure date 925 (shown in FIG. 9), which indicates the device user will have a high probability to be late to the event if the user has not started moving towards the event location by this time. In order to determine the late departure date 925, navigation daemon provides a "time to leave for being late" that only makes a small percentage of the users (e.g., a predetermined percentage such as 5% of the users who drive or walk faster than average) to be on time.

Figure 11:
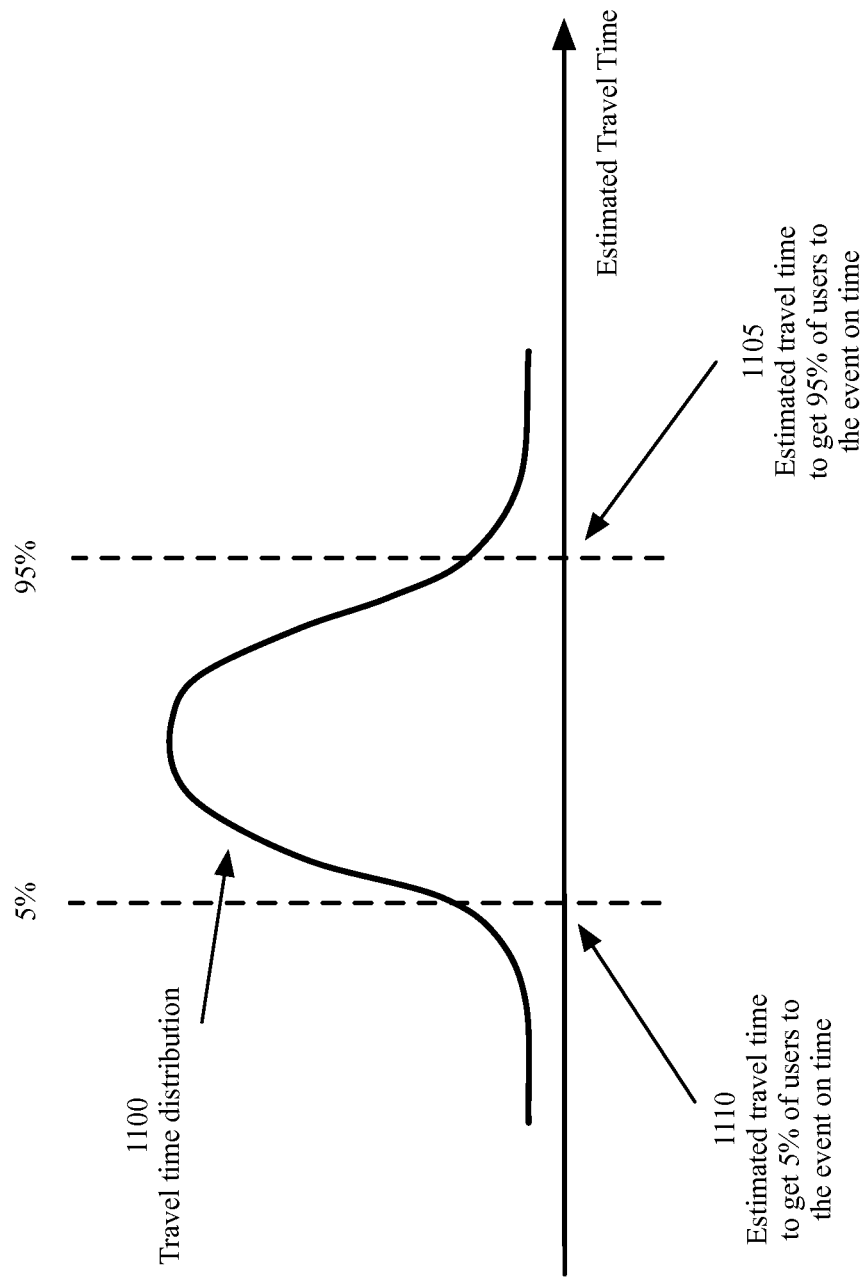
FIG. 11 conceptually illustrates the distribution of travel times of different people from the current location of the device to an event location in some embodiments.

FIG. 11 conceptually illustrates the distribution 1100 of travel times of different people from the current location of the device to an event location in some embodiments. As shown, the estimated travel time for being on time 1105 gets a high percent of the users (e.g., a predetermined percentage such as 95% of the users) to the event location on time. The suggested departure date (or time to leave) 920 in FIG. 9 is the event start time 915 minus the high confidence estimated travel time 1105.

In contrast, estimated travel time for being late 1110 (which is shorter than estimated travel time 1105) only gets 5% of the users to the event on time. The late departure date 925 is the event start time 915 minus the low confidence estimated travel time 1110. This is the departure time at which the calendar application can provide an alert to the user with a high level of confidence that the majority of the users by this time are going to be late to the event.

Figure 12A:
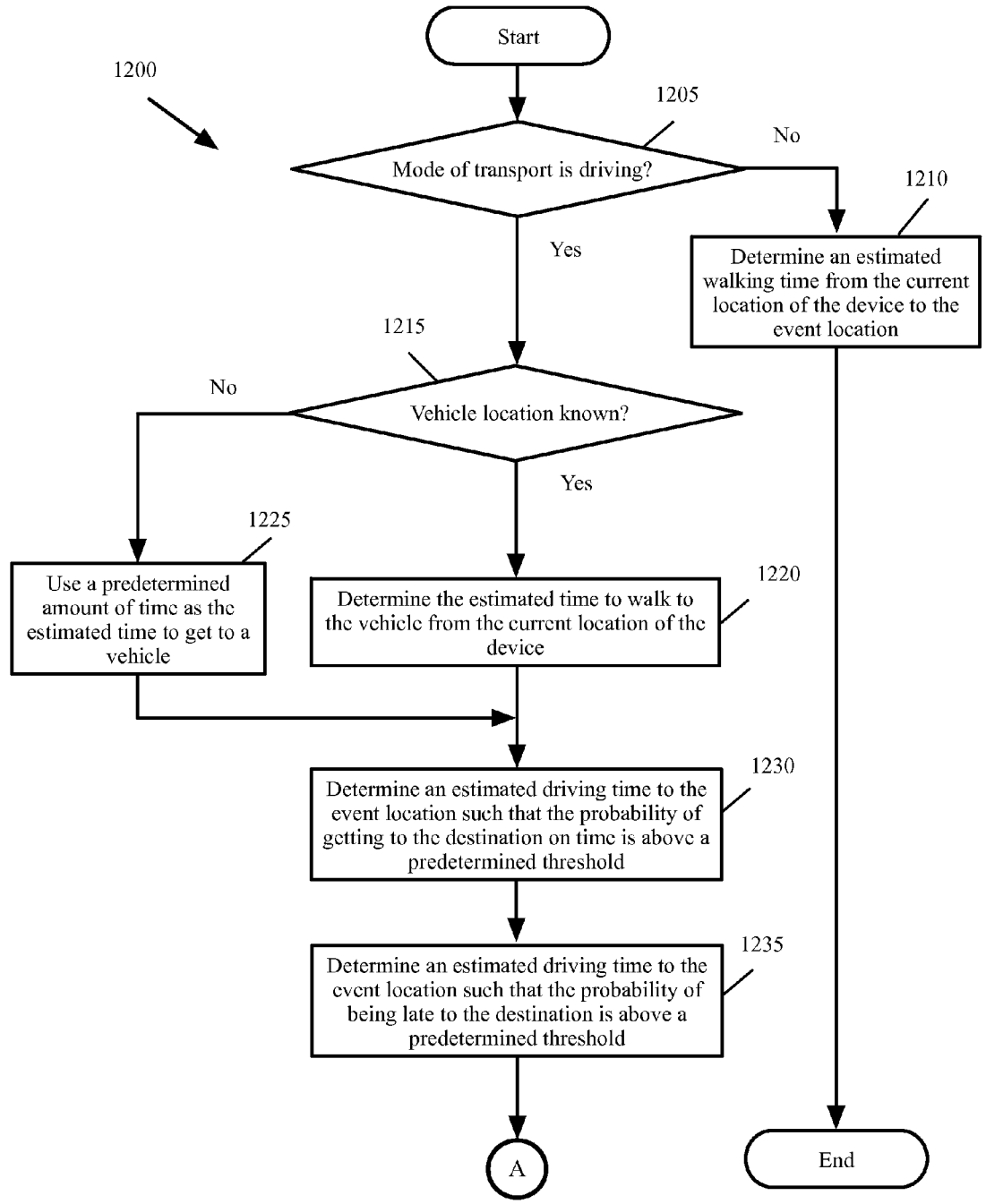
FIGS. 12A and 12B conceptually illustrate a process for estimating the travel time in some embodiments of the invention.
Figure 12B:
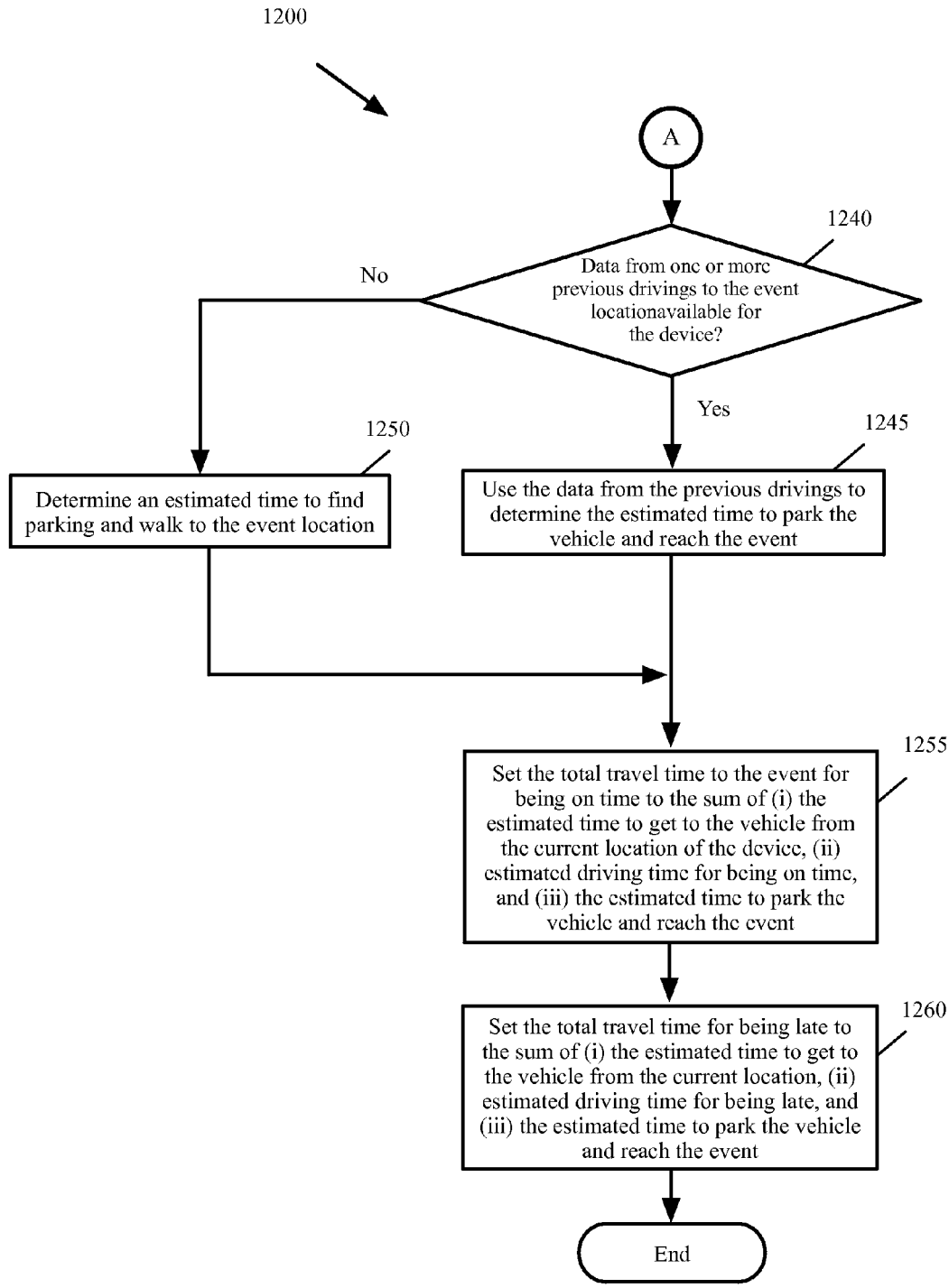

FIGS. 12A and 12B conceptually illustrate a process 1200 for estimating the travel time in some embodiments of the invention. Process 1200 in some embodiments is performed by a service such as the navigation daemon 105. As shown, the process determines (at 1205) whether the mode of transportation (e.g., transport type 945 in FIG. 9) is driving. If not, the process determines (at 1210) an estimated walking time from the current device location to the event location. In some embodiments, process 1200 provides the current location of the device and the location of the event to a set of one or more external servers (e.g., through the mapping service interface 150) to determine and send back the walking time to the event location. In other embodiments, process 1200 determines the estimated walking time instead of using the external servers. The process then ends.

When the transportation mode is driving, the process determines (at 1215) whether the vehicle location is known. For instance, in some embodiments, the device includes a service that determines (e.g., by interacting with the vehicle interface 160 described above) whether the device is inside a vehicle or at what location the device has left the vehicle. This location is stored as a possible location that the vehicle is parked. In other embodiments, the device includes a service that interacts with the navigation engine (165) to determine whether the device is navigating to a destination and once the device reaches the destination stores the final destination as a possible location that the vehicle is parked.

When the location of the vehicle is known, the process determines (at 1220) the estimated time to walk to the vehicle location from the current location of the device. In some embodiments, process 1200 provides the current device location and the location of the vehicle to a set of one or more external servers to determine and send back the walking time to the vehicle. In other embodiments, the process 1200 determines the estimated walking time to the vehicle instead of using the external servers. The process then proceeds to 1230, which is described below.

When the location of the vehicle is not known, the process uses (at 1225) a predetermined amount of time as the estimated time to get from the current device location to a vehicle. The process then determines (at 1230) an estimated driving time to the event location (e.g., as described by reference to travel time 1105 in FIG. 11) such that the probability of getting to the destination on time is above a predetermined threshold (e.g., 85%, 90%, 95%, etc.). In some embodiments, process 1200 provides the vehicle location and the event location to a set of one or more external servers to determine and send back the driving time to the event location. In some embodiments, the process also provides a requested confidence level (as described above) to the set of servers to get a high percentage of the users to the event on time. In other embodiments, the servers are preprogrammed to provide such a high confidence estimate. In some embodiments, the process 1200 determines the estimated driving time for being on time instead of using the external servers.

The process also optionally determines an estimated driving time to the event location (e.g., as described by reference to travel time 1110 in FIG. 11) such that the probability of being late to the destination is above a predetermined threshold (e.g., 80%, 95%, 98%, etc.). In some embodiments, process 1200 provides the vehicle location and the event location to a set of one or more external servers and request to determine and send back the driving time to the event location. In some embodiments, the process also provides a requested confidence level to the set of servers such that the majority of the users get to the event late. In other embodiments, the servers are preprogrammed to provide such a confidence level in the estimate. In some embodiments, the process 1200 determines the estimated driving time for being late instead of using the external servers.

The process then determines (at 1240) whether data from one or more previous drivings to the event location is available for the device (or for the device user). In some embodiments, a service on the device stores different navigational information such as location of the device at different points of time. If data from one or more previous driving is available, the process uses (at 1245) the data to determine the estimated time to park the vehicle and reach the event. The process then proceeds to 1255, which is described below.

Otherwise, the process determines (at 1250) an estimated time to find parking and walk to the event location. The process then sets (at 1255) the estimated total travel time to get to the event on time to the sum of the estimated time to get to the vehicle from the current device location, the estimated driving time for being on time, and the estimated time to park the vehicle and reach the event. The process then optionally sets (at 1260) the estimated total travel time for being late to the event to the sum of the estimated time to get to the vehicle from the current device location, the estimated driving time for being late, and the estimated time to park the vehicle and reach the event. The process then ends.

Referring back to FIG. 9, the suggested departure time (time to leave) 920 provided in the hypothesis 900 indicates a time for leaving to the event that is not just the median or average of the time to leave calculated over a large population of users. Instead, as described above, the time to leave is skewed (e.g., by a percentage set at program time or at run time) to ensure that a much higher percentage (e.g., 85%, 90%, 95%, etc.) of the device users get to calendar events on time. This high percentage of success is achieved in part because the time to travel is calculated such that a high percentage of the users (e.g., a percentage such as 85%, 90%, 95% set at program time or at run time) rather a median time to travel that gets half of the users to the events on time.

The hypothesis 900 also includes one or more of the following items. Starting location 940, which is the current location of the device. Transport type 945, which is the type of transportation (e.g., driving or walking) for which the travel estimates are provided. Travel state 950, which indicates whether the device is not moving, is moving towards the event location, is moving away from the event location, or is moving but unclear whether or not towards the event location. The hypothesis also optionally provides one or more of current traffic density (e.g., low, medium high) 955, historical traffic density (e.g., low, medium high) 960, the most relevant incidents 965 along the route to the event location, road closures 970 on the route to the event location, current weather conditions 975, etc.

C. Generating Time to Leave Alerts

Once the total travel time that provides a high confidence level for getting the device to the event on time is determined (e.g., as described above by reference to FIG. 12), time to leave for being on time is calculated as follows:

$$\text{Time to leave for getting to the event on time} = \text{the event start time} - \text{the estimated total travel time for getting to the event on time}$$

In some embodiments, the above calculation is done by a set of servers that provide the estimated time to leave. In other embodiments, the above calculation is done by navigation daemon (e.g., before the end of process 1200). In other embodiments, navigation daemon provides the estimated total travel time for getting to the event on time in the hypothesis data structure (e.g., in addition to or in lieu of suggested departure date 925) and the calendar application calculates time to leave using the estimated total travel time. The following examples describe the embodiments where the time to leave is sent by the navigation daemon to the calendar application. It should be understood that the discussions are also applicable to the embodiments that the calendar application or the set of servers calculate the time to leave.

In some embodiments, the navigation daemon provides time to leave estimates at several times and each time updates the time to leave based on several factors such as the time remaining to the start of the event, current traffic conditions, incidents on the road, road closures, etc.

Figure 13A:
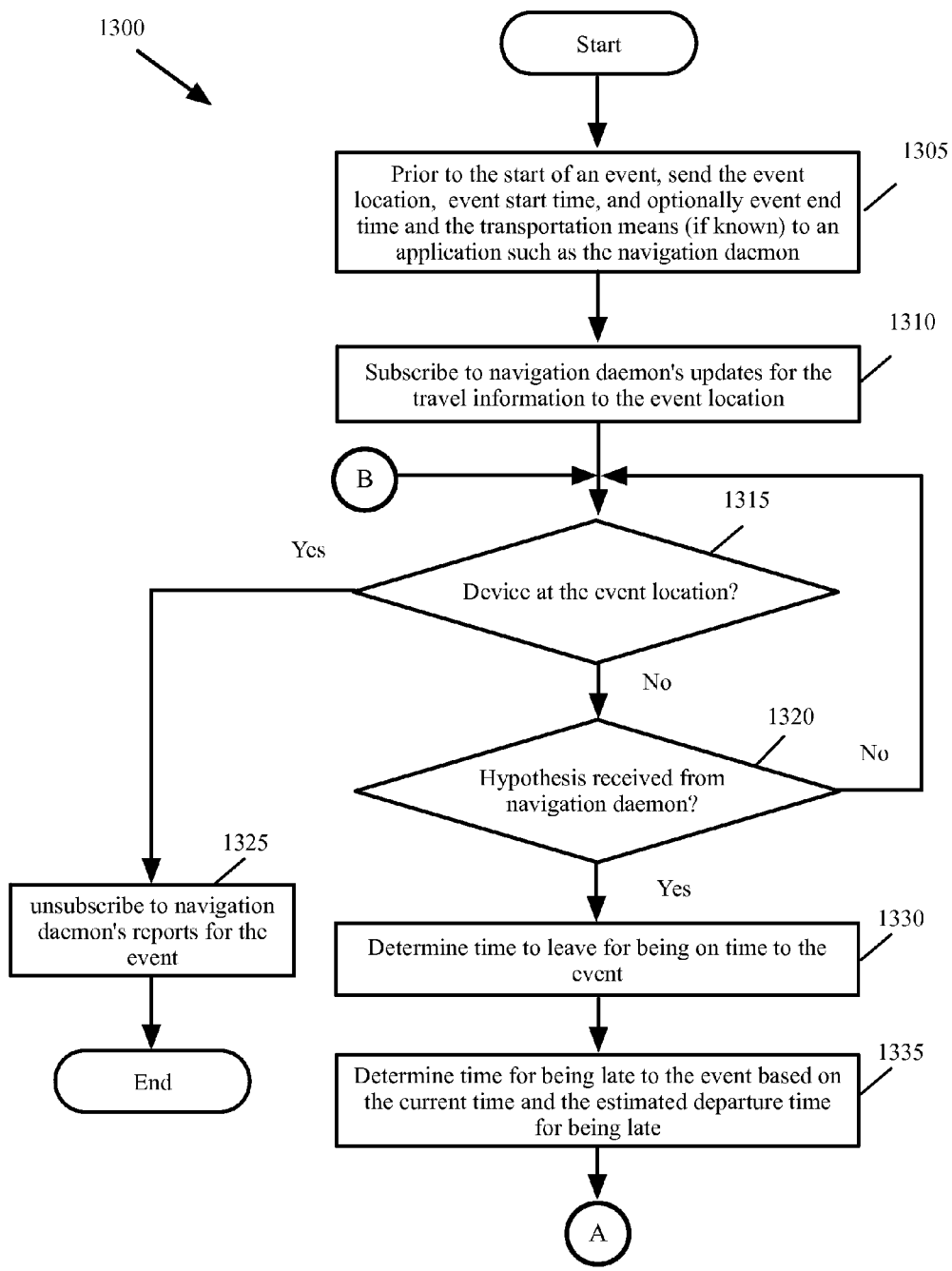
FIGS. 13A-13B conceptually illustrate a process for providing time to leave alerts by the calendar application in some embodiments.
Figure 13B:
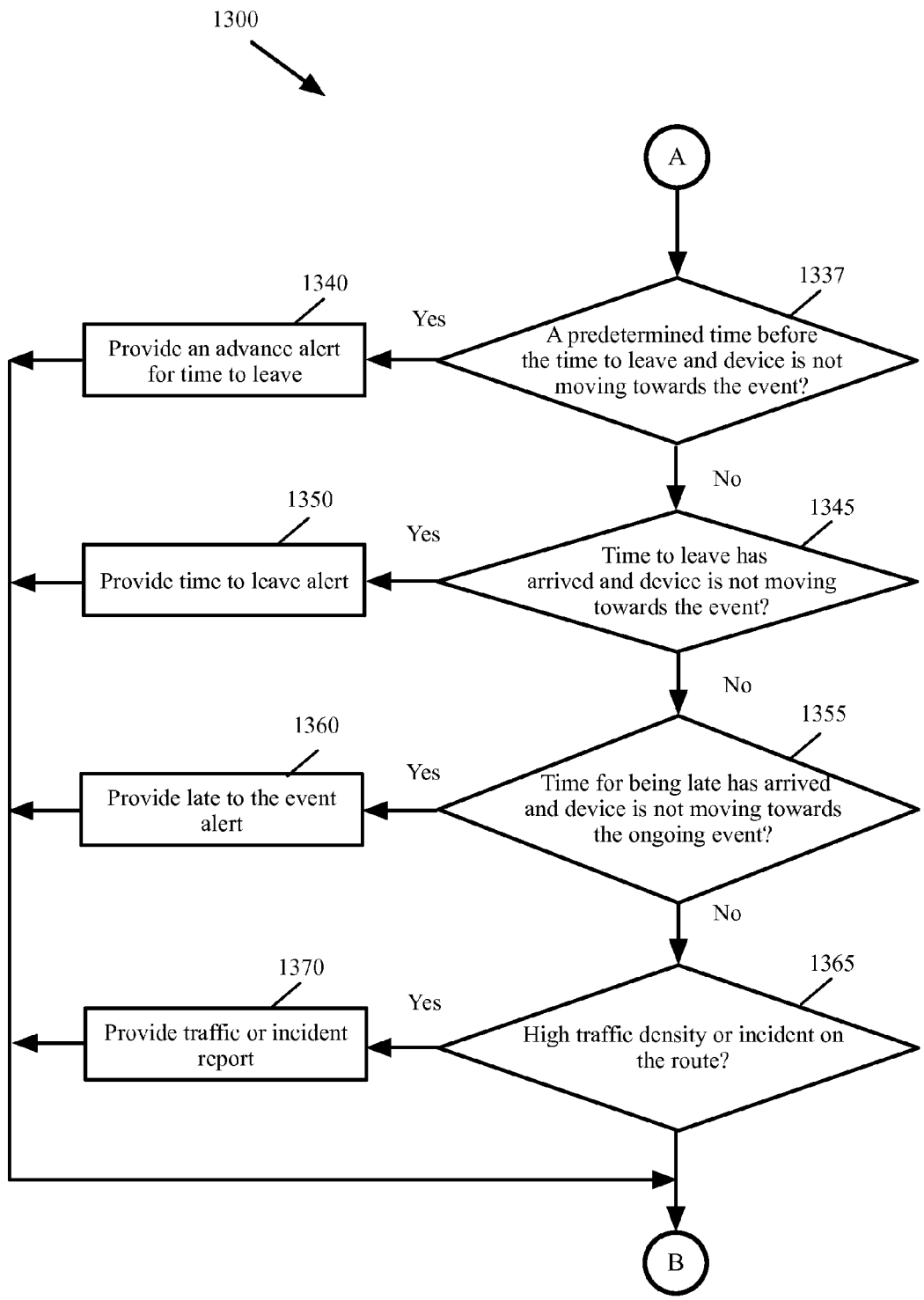

FIGS. 13A-13B conceptually illustrate a process 1300 for providing time to leave alerts by the calendar application in some embodiments. As shown, prior to the start of an event, the process sends (at 1305) the event location (e.g., the event location handle) and the event start time to a navigation application service (e.g., to the navigation daemon). The process also optionally sends the event end time (or event duration) and the transportation means (if known) to the navigation daemon. For instance, at a predetermined time (such as 4 hours, 2 hours, 1 hour, etc.) prior to the start of an event the process sends the event information to the navigation daemon.

The process then subscribes (at 1310) to navigation daemon's updates to the travel information to the event location. For instance, the calendar application in some embodiments utilizes an API that is used for inter-process communication to receive the event hypothesis from the navigation daemon. In other embodiments, the calendar application gets a notification (e.g., gets waked up or receives an interrupt) when the navigation application has updated information regarding the event. The process then determines (at 1315) whether the device has reached the destination (i.e., the event location). If yes, the process unsubscribes (at 1325) to navigation reports for the event. The process then ends.

Otherwise, the process determines whether a hypothesis is received (at 1320) from the navigation daemon. If not, the process proceeds (e.g., after a predetermined delay) to 1315, which was described above. Otherwise, the process determines (at 1330) the time to leave for being on time to the event. For instance the process retrieves the suggested departure date (or time to leave) 920 from the hypothesis data structure 900 shown in FIG. 9.

The process then optionally determines (at 1335) the time for being late to the event. For instance the process retrieves the late departure date 925 from the hypothesis data structure 900 shown in FIG. 9.

The process then determines (at 1337) whether it is a predetermined time before the time to leave and the device is not moving towards the event location. If not, the process proceeds to 1345, which is described below. Otherwise, the process provides (at 1340) an advance alert for time to leave. For instance, if time to leave is 5:23 PM, 15 minutes prior that time (i.e., at 5:08 PM) the process provides an alert to the user that "you have 15 minutes to leave to dad's birthday party." The alert can be one or more of a visual pop up message, an audible message, an email, a text message, etc. The process then proceeds to 1315, which was described above. In some embodiments, process 1300 generates one or more advance alerts for each event. Also, in some embodiments, the process provides the advance alerts for time to leave once the predetermined time has arrived regardless of whether or not the device is moving towards the event location. In other embodiments, the process provides the advance alerts for time to leave only when the predetermined time has arrived and the device is not moving towards the event location.

The process determines (at 1345) whether the time to leave has arrived and the device is not moving towards the event location. If not, the process proceeds to 1355, which is described below. Otherwise, the process provides (at 1350) a time to leave alert. For instance, the process provides an alert to the user that "it is time to leave to dad's birthday." The alert can be one or more of a visual pop up message, an audible message, an email, a text message, etc. The process then proceeds to 1315, which was described above. In some embodiments, the process provides the alert for time to leave once the time to leave has arrived regardless of whether or not the device is moving towards the event location. In other embodiments, the process provides the alert for time to leave only when the time to leave has arrived and the device is not moving towards the event location.

The process determines (at 1355) whether the time for being late has arrived and the device is not moving towards the event location. If not, the process proceeds to 1365, which is described below. Otherwise, the process provides (at 1360) a late to the event alert. For instance, the process provides an alert to the user that "you are late for going to dad's birthday." The alert can be one or more of a visual pop up message, an audible message, an email, a text message, etc. The process then proceeds to 1315, which was described above. Some embodiments do not use a separate time for being late. These embodiments provide the late to the event alert if a predetermined time (e.g., 5 minutes, 10 minutes, etc.) has passed from the time to leave and the device has not started moving towards the event.

The process determines (at 1365) whether traffic or incident reports are available for the route to the event location. If not, the process proceeds to 1315, which was described above. Otherwise, the process retrieves the report form the hypothesis data structure and provides a message to the device user. The process proceeds to 1315, which was described above. Some embodiments do not provide such traffic or incident reports. These embodiments, bypass operations 1365-1370. Other embodiments provide additional information (such as weather reports) if the additional information is available from the hypothesis data structure.

III. Power Saving Techniques for Providing Time to Leave Updates

When calendar application requests travel updates for an event, the navigation daemon provides several updates for a duration time from receiving the calendar application's request up to the time that the device reaches the event location or the time that the event ends. The travel updates require utilizing power consuming tasks for determining the current location of the device, setting a route to the event location, accessing different databases, utilizing the network resources, etc. The navigation daemon in some embodiments implements several novel power saving techniques for generating time to leave and other date items in the event hypothesis.

Figure 14A:
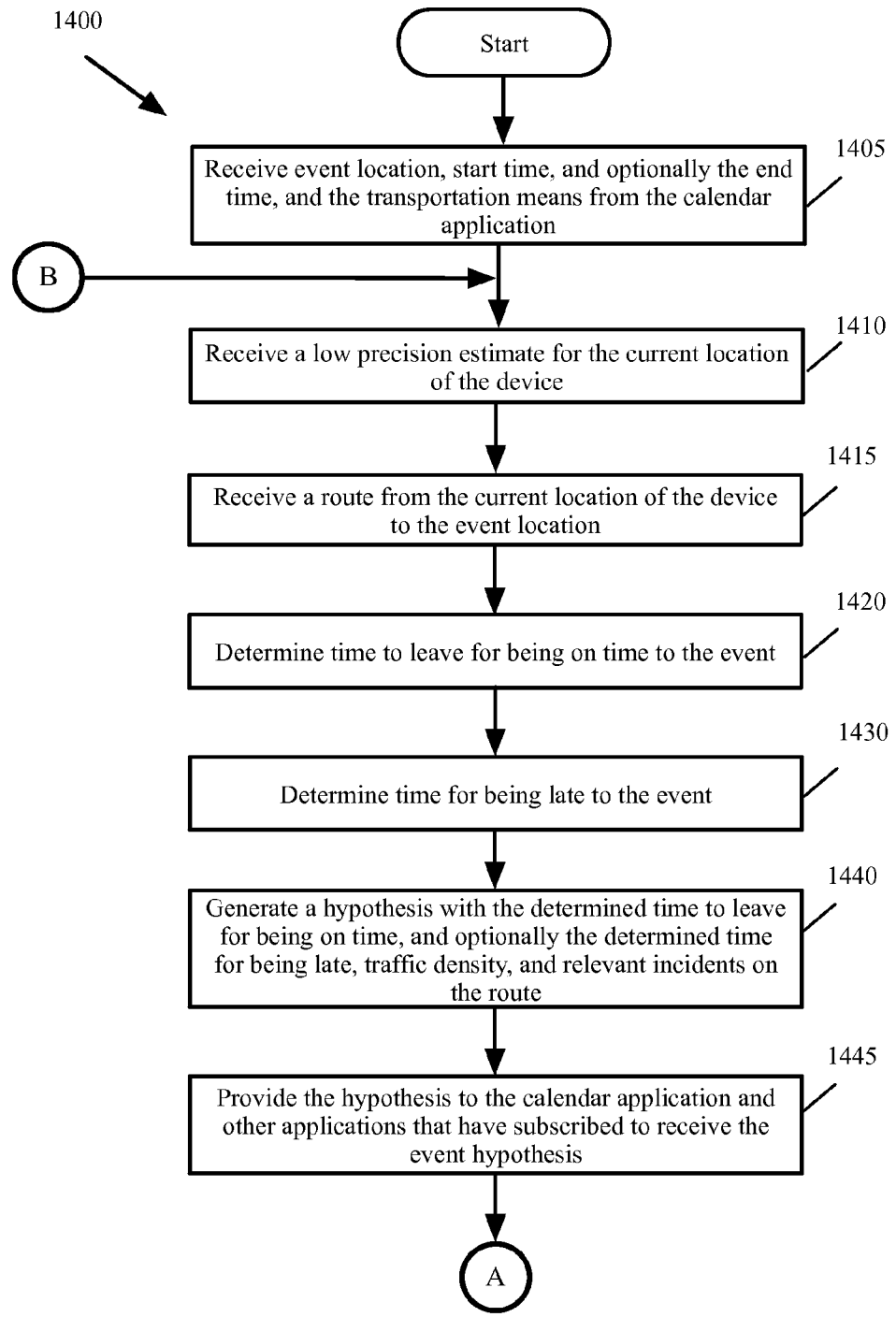
FIGS. 14A-14B conceptually illustrate a process for generating event hypothesis in some embodiments.
Figure 14B:
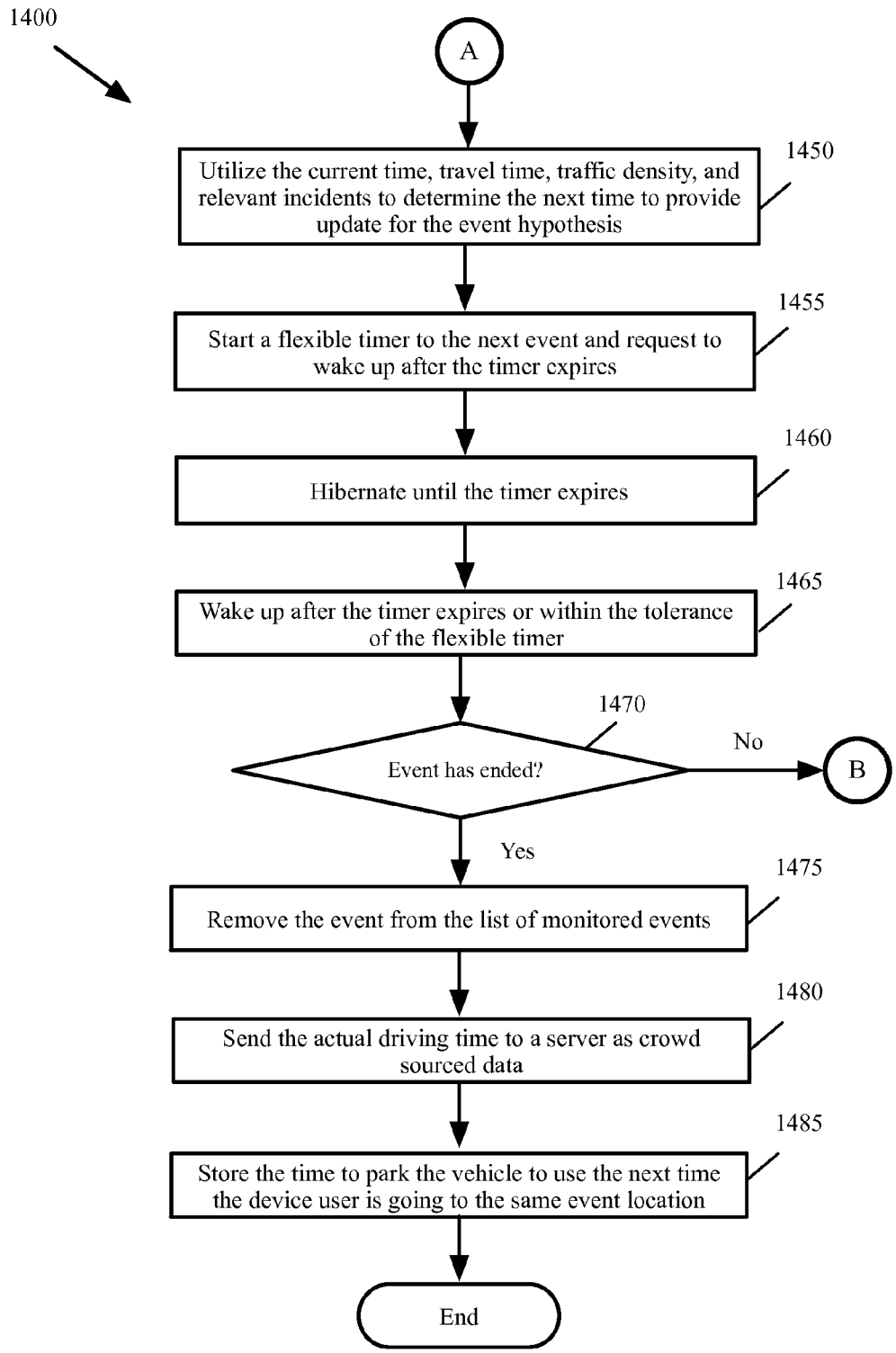

FIGS. 14A-14B conceptually illustrate a process 1400 for generating event hypothesis in some embodiments. Process 1400 is performed by a navigation service such as the navigation daemon in some embodiments. As shown, the process receives (at 1405) the event location and the event start time (e.g., the event location handle) from the calendar application. The process in some embodiments also optionally receives the event end time and the transportation means.

The process then receives (at 1410) a low precision estimate for the current location of the device. Process 1400 is used to determine the estimated travel time and time to leave to an event and does not require precise device location as required by other applications such as the navigation engine. It is more relevant to process 1400 whether the device is moving towards the event location than a perceive location of the device.

In some embodiments, an application that requests the device location specifies the level of precision required for the device location (e.g., high, medium, or low precision). Device location identification engine 175 (shown in FIG. 1) utilizes the required level of precision to optimize the power consumption. For instance, in order to save power and processing resources, the navigation daemon requests for a low precision estimate of the device location to calculate the travel time to an event location. When the required precision level is low, the device location identification engine 175 may use a low power and low precision WiFi location determination method instead of GPS.

The device location identification engine 175 may also provide a GPS based location, if that location is recently calculated for another application on the device. In some embodiments, device location identification engine 175 coalesces requests for device location from several applications on the device. In these embodiments, if the higher precision GPS positioning is already determined for another application, the same location data is provided to the navigation daemon. Otherwise, a low precision, low power consuming method (such as WiFi) is used to determine the device location.

The process then receives (at 1415) a route from the current location of the device to the event location. For instance, the process in some embodiments provides the event location to a routing engine that executes on the device to set a route to the event location. In other embodiments, the process requests the mapping service interface 150 (shown in FIG. 1) to make a network request to a route generator running on a set of external servers to generate and provide the route to the device.

Some embodiments coalesce location request, route requests and/or network requests among several applications. As described below, the process hibernates (at 1460) and wakes up when a flexible timer expires. The flexible timer is used to coalesce location requests (at 1410), route requests (1415), and/or network access requests of process 1400 with other application requesting the same resources to save power. Applications that need the same resources are woken up together (within the tolerance of their flexible timers) to share the same resources and/or the same information.

The process then determines (at 1420) the time to leave for being on time to the event with a predetermined high confidence to arrive on time to the event. For instance, the process uses the methods described above by reference to FIGS. 10-12B.

The process then determines (at 1430) the time for being late to the event with a predetermined percentage chance that the majority of the user will be late to the event at that time. For instance, the process uses the method described above by reference to FIGS. 10-12B. The process then generates (at 1440) a hypothesis for the event with the time to leave for being on time, time for being late, and the other data items as described above by reference to FIG. 9. The process then provides (at 1445) the hypothesis (such as hypothesis 900 in FIG. 9) to the applications (such as the calendar application) that have subscribed to receive the event hypothesis.

Figure 15:
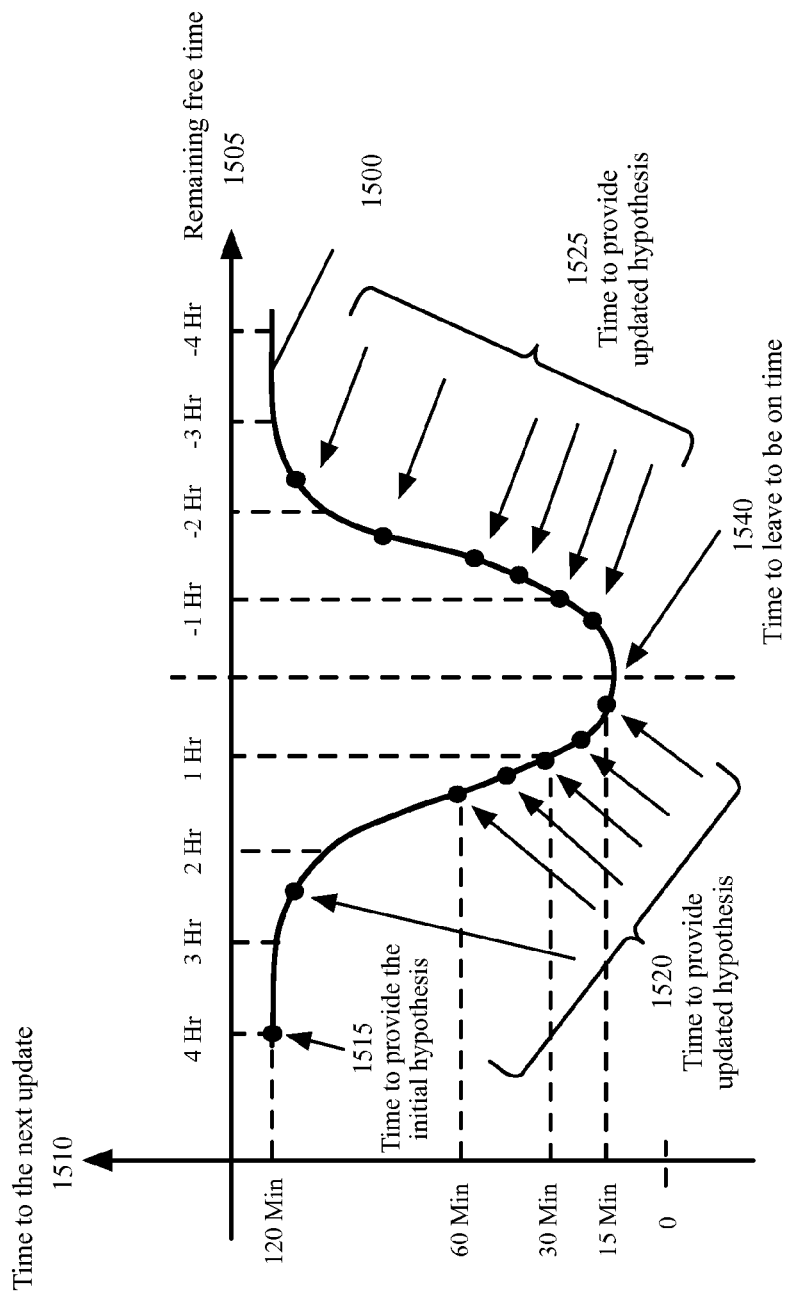
FIG. 15 conceptually illustrates a function for determining the next time to provide update for an event hypothesis in some embodiments.

The process then utilizes (at 1450) the current time, the travel time, traffic density, and other optional information such as relevant incident on the route to determine the next time to provide an update to the event hypothesis. FIG. 15 conceptually illustrates a function for determining the next time to provide update for an event hypothesis in some embodiments. The function 1500 maps the remaining free time before the time to leave (the x axis 1505) against the time to provide the next update to the event hypothesis (the y axis 1510).

Figure 16:
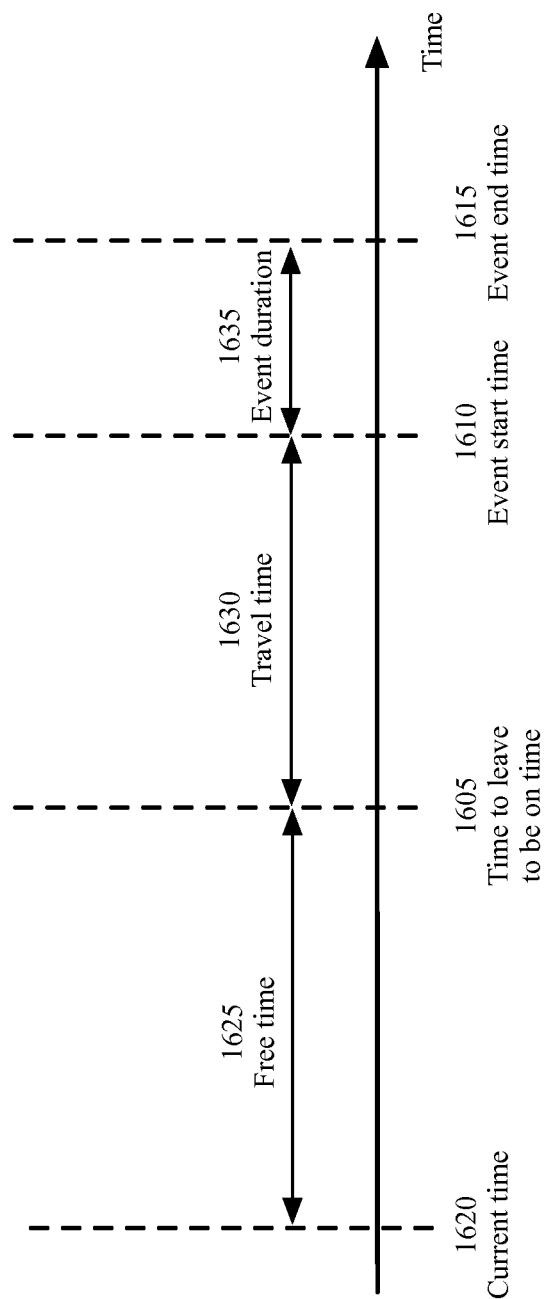
FIG. 16 conceptually illustrates the remaining free time before leaving for an event in some embodiments.

FIG. 16 conceptually illustrates the remaining free time before leaving for an event in some embodiments. As shown, the event duration 1635 is from the start time 1610 of the event to the end time 1615 of the event. The time to leave to be on time 1605 is the difference between the start time of the event 1610 and the travel time 1630 (as described by reference to FIGS. 10 and 12A-12B) for being on time. The free time 1625 is the time from the current time 1620 to the time to leave to be on time 1605.

Function 1500 in FIG. 15 expresses the polling frequency to provide time to leave estimates as a function of the remaining free time. Function 1500 in some embodiments is generated based on machine learning by using empirical and historical data. For instance, the function is generated based on factors such as how fast the traffic changes. The function is generated by determining how much the traffic can change within different time periods (such as 15, 30, 60, 120, 180, 240 minutes, etc.). The next time to provide an event hypothesis update is then determined based on the amount that the traffic can change. For instance, 4 hours before the time to leave, the traffic many change many times. There is no reason to update the event hypothesis too often. The function 1500 therefore provide a longer time to update the hypothesis when there is still a long free time remains to the start of the event. In contrast, as time to leave gets closer, the traffic change will have a larger impact on time to leave. The function 1500 therefore provides a shorter time to update the hypothesis when the free time before time to leave shortens.

As shown in FIG. 15, graph 1500 is constructed in a way that as the time gets closer to the time to leave, the frequency of updates becomes faster. The use of graph 1500 provides power saving since the frequency of updates is not fixed. Instead, the updates are more frequent as time to leave gets closer.

When the calendar application originally provides the event information to the navigation daemon (in this example 4 hours prior to time to leave), the navigation daemon provides an initial event hypothesis at time 1515. The next time 1520 to provide an update is then determined by entering the remaining free time on the function 1500 to get the corresponding time to provide the next update. For instance, the example of FIG. 15 shows that at 1 hour before the current estimate for time to leave (1 hour of free time), the next update should be provided in 30 minutes (as shown on the vertical axis 1510).

In addition, the navigation daemon in some embodiments considers factors other than the remaining free time to determine the time for the next update. For instance, when current time gets closer to time to leave and traffic conditions are worst than historical averages, navigation daemon reduces the time to next update. In contrast, when traffic conditions are lighter than historical averages, the navigation daemon increases the time to next update. The frequency of update in some embodiments is a mathematical function, which is a function of the remaining time as well as other factors such as traffic condition. When navigation daemon wakes up, it first gets a new estimated time to leave (e.g., from the aforementioned set of external servers). Navigation daemon then calculates the remaining free time. The remaining free time is then fed into the mathematical function to output the update frequency (i.e., the time to provide the next update).

Also as shown, function 1500 is used to provide hypothesis updates at time intervals 1520 before the time to leave 1540 as well as time intervals 1525 after time to leave (if the event is still in progress and the device has not reached the event location). It should be understood that function 1500 is a fixed function and is used to map remaining free times to the time to provide the next travel time (i.e., event hypothesis) update.

Referring back to FIG. 14B, once the time for providing the next update is determined, the process sets (at 1455) a timer to wake up for the next update and request to wake up after the timer expires. In order to save power, the timer in some embodiments is a flexible timer that specifies the time to next update as the latest time to wake up. In addition, the timer includes a tolerance interval that allows the process to wake up at an earlier time. For instance, if the time for next update is 1 hour, the timer specifies 1 hour as the latest time to wake up with a 20 minutes tolerance. In other words, the timer indicates that the process has to hibernate for at least 40 minutes (i.e., the ideal time to wake up is 1 hour but the process can wake up any time after 40 minutes).

The use of a flexible timer allows coalescing of wake up requests for several applications and services. For instance, the applications and services that require a particular resource such as GPS, processing unit, network, etc., can be timed to wake up together. The applications or services that require particular resources specify which resources they require and they are woken up together (e.g., by the device operating system) within the tolerance period of their wake up timers. The applications can wake up at the same time and share the same information.

Process 1400 then hibernates (at 1460) until the flexible timer expires. The process then wakes up (at 1465) when the flexible timer expires (or when the process is waken up within the timer's tolerance time). The process then determines (at 1470) whether the event has ended. If not, the process proceeds to 1410, which was described above.

Otherwise, the process removes (at 1475) the event from the list of monitored events (i.e., the events for which process 1400 provides hypothesis updates). The process then optionally sends (at 1480) the actual driving time to an external server as crowd sourced data. The process also optionally stores (at 1485) the time to park the vehicle to use (e.g., by process 1200) the next time that the device user is going to the same event location. The process then ends.

Use of process 1400 and function 1500 ensures that the suggested departure time (time to leave) 920 in the hypothesis data structure is not stale. When a lot of time remains before time to leave, the hypothesis is updated less frequently. As the time to the start of the event (and time to leave) approaches, the hypothesis is updated more frequently to guarantee that the calendar application provide time to leave alerts with enough accuracy to ensure the device user gets to the event on time.

In some embodiments, process 1400 stops providing time to leave estimate if the process determines that the device is actively moving away from the event location. For instance, the process sets a route (at 1415) to the event location. This route can change over time. Whenever the process is providing the next time to leave estimate and determines that the device moved away from the event location, the corresponding hypothesis for that event is penalized. For instance, when the calendar application requests time to leave estimates for several events, process 1400 provides a separate hypothesis for each event. Two or more of these events may share a portion of their routes. As long as the device is travelling along the common portion of the routes to several events, process 1400 provides a hypothesis for each event. Once the device comes to a fork and proceeds away from the location of an event, the hypothesis for that event is penalized as being an event that the user may not be going to. Once the process determines that the device is moving away from an event and, for example, the probability that the device is moving towards the event is lower than a threshold, the process stops proving time to leave updates.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger application while remaining distinct software inventions. In some embodiments, multiple software inventions can also be implemented as separate applications. Finally, any combination of separate applications that together implement a software invention described here is within the scope of the invention. In some embodiments, the software applications, when installed to operate on one or more electronic systems, define one or more specific machine implementations that execute and perform the operations of the software applications.

A. Mobile Device

Figure 17:
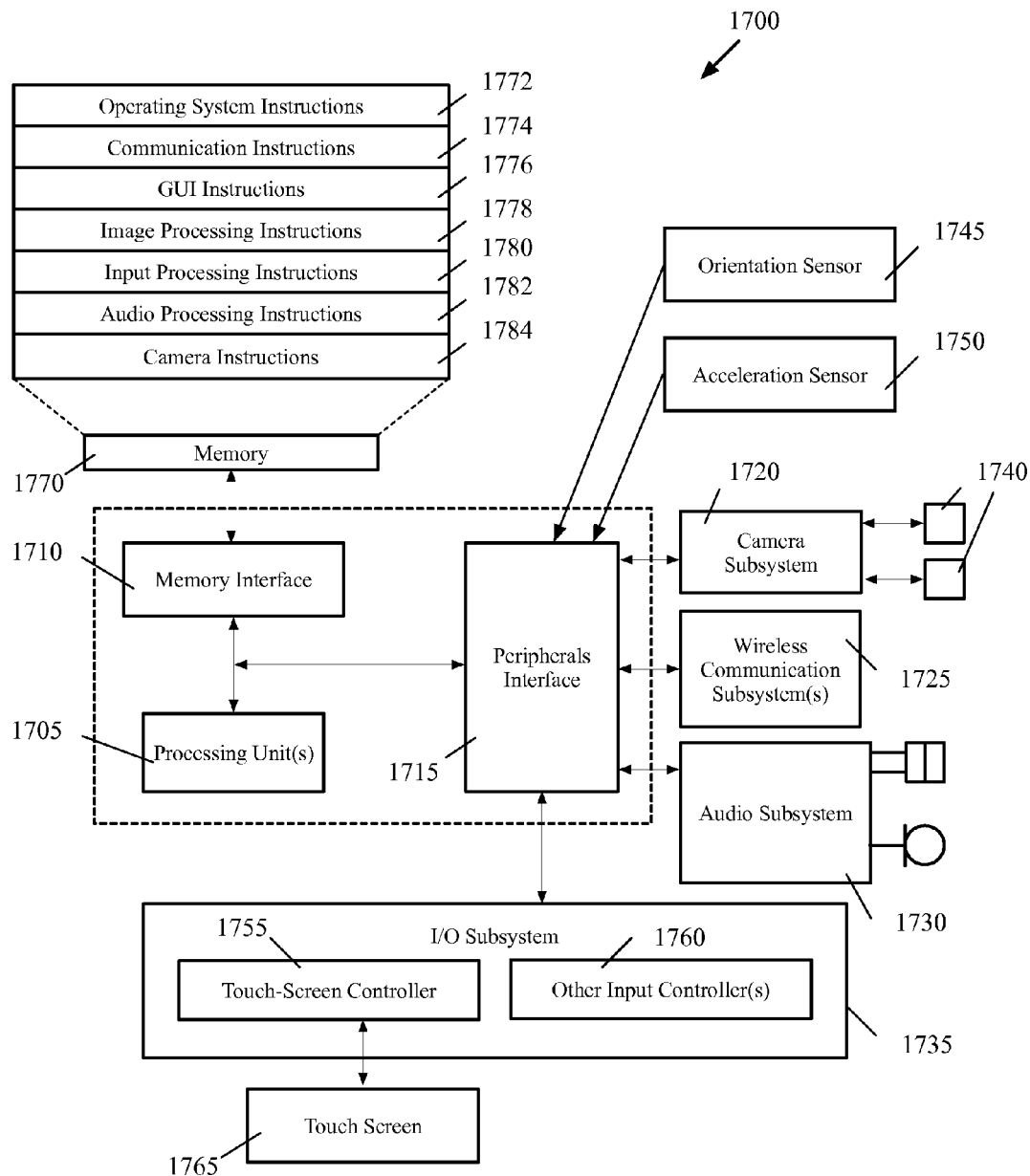
FIG. 17 is an example of an architecture of a mobile computing device in some embodiments.

The mapping and navigation applications of some embodiments operate on mobile devices, such as smart phones (e.g., iPhones®) and tablets (e.g., iPads®). FIG. 17 is an example of an architecture 1700 of such a mobile computing device. Examples of mobile computing devices include smartphones, tablets, laptops, etc. As shown, the mobile computing device 1700 includes one or more processing units 1705, a memory interface 1710 and a peripherals interface 1715.

The peripherals interface 1715 is coupled to various sensors and subsystems, including a camera subsystem 1720, a wireless communication subsystem(s) 1725, an audio subsystem 1730, an I/O subsystem 1735, etc. The peripherals interface 1715 enables communication between the processing units 1705 and various peripherals. For example, an orientation sensor 1745 (e.g., a gyroscope) and an acceleration sensor 1750 (e.g., an accelerometer) is coupled to the peripherals interface 1715 to facilitate orientation and acceleration functions.

The camera subsystem 1720 is coupled to one or more optical sensors 1740 (e.g., a charged coupled device (CCD) optical sensor, a complementary metal-oxide-semiconductor (CMOS) optical sensor, etc.). The camera subsystem 1720 coupled with the optical sensors 1740 facilitates camera functions, such as image and/or video data capturing. The wireless communication subsystem 1725 serves to facilitate communication functions. In some embodiments, the wireless communication subsystem 1725 includes radio frequency receivers and transmitters, and optical receivers and transmitters (not shown in FIG. 17). These receivers and transmitters of some embodiments are implemented to operate over one or more communication networks such as a GSM network, a Wi-Fi network, a Bluetooth network, etc. The audio subsystem 1730 is coupled to a speaker to output audio (e.g., to output voice navigation instructions). Additionally, the audio subsystem 1730 is coupled to a microphone to facilitate voice-enabled functions, such as voice recognition (e.g., for searching), digital recording, etc.

The I/O subsystem 1735 involves the transfer between input/output peripheral devices, such as a display, a touch screen, etc., and the data bus of the processing units 1705 through the peripherals interface 1715. The I/O subsystem 1735 includes a touch-screen controller 1755 and other input controllers 1760 to facilitate the transfer between input/output peripheral devices and the data bus of the processing units 1705. As shown, the touch-screen controller 1755 is coupled to a touch screen 1765. The touch-screen controller 1755 detects contact and movement on the touch screen 1765 using any of multiple touch sensitivity technologies. The other input controllers 1760 are coupled to other input/control devices, such as one or more buttons. Some embodiments include a near-touch sensitive screen and a corresponding controller that can detect near-touch interactions instead of or in addition to touch interactions.

The memory interface 1710 is coupled to memory 1770. In some embodiments, the memory 1770 includes volatile memory (e.g., high-speed random access memory), non-volatile memory (e.g., flash memory), a combination of volatile and non-volatile memory, and/or any other type of memory. As illustrated in FIG. 17, the memory 1770 stores an operating system (OS) 1772. The OS 1772 includes instructions for handling basic system services and for performing hardware dependent tasks.

The memory 1770 also includes communication instructions 1774 to facilitate communicating with one or more additional devices; graphical user interface instructions 1776 to facilitate graphic user interface processing; image processing instructions 1778 to facilitate image-related processing and functions; input processing instructions 1780 to facilitate input-related (e.g., touch input) processes and functions; audio processing instructions 1782 to facilitate audio-related processes and functions; and camera instructions 1784 to facilitate camera-related processes and functions. The instructions described above are merely exemplary and the memory 1770 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software applications or modules. Various functions of the mobile computing device can be implemented in hardware and/or in software, including in one or more signal processing and/or application specific integrated circuits.

While the components illustrated in FIG. 17 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 17 may be split into two or more integrated circuits.

B. Computer System

Figure 18:
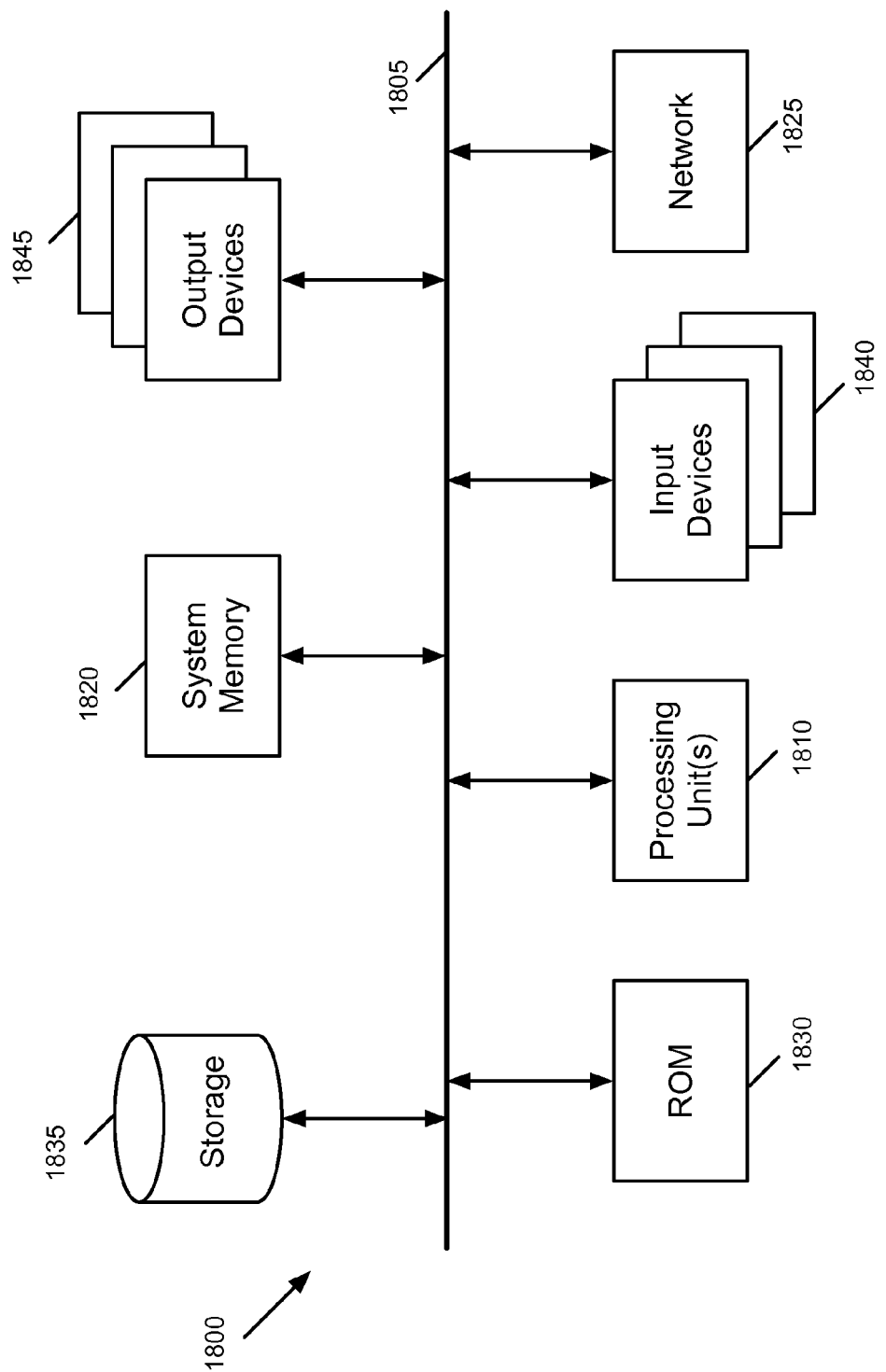
FIG. 18 conceptually illustrates another example of an electronic system with which some embodiments of the invention are implemented.

FIG. 18 conceptually illustrates another example of an electronic system 1800 with which some embodiments of the invention are implemented. The electronic system 1800 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1800 includes a bus 1805, processing unit(s) 1810, a system memory 1820, a network 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the system memory 1820, and the permanent storage device 1835.

From these various memory units, the processing unit(s) 1810 retrieves instructions to execute and data to process in order to execute the processes of the invention. The processing unit(s) may be a single processor or a multi-core processor in different embodiments.

The read-only-memory (ROM) 1830 stores static data and instructions that are needed by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive, integrated flash memory) as the permanent storage device 1835.

Other embodiments use a removable storage device (such as a floppy disk, flash memory device, etc., and its corresponding drive) as the permanent storage device. Like the permanent storage device 1835, the system memory 1820 is a read-and-write memory device. However, unlike storage device 1835, the system memory 1820 is a volatile read-and-write memory, such a random access memory. The system memory 1820 stores some of the instructions and data that the processor needs at runtime. In some embodiments, the invention's processes are stored in the system memory 1820, the permanent storage device 1835, and/or the read-only memory 1830. From these various memory units, the processing unit(s) 1810 retrieves instructions to execute and data to process in order to execute the processes of some embodiments.

The bus 1805 also connects to the input and output devices 1840 and 1845. The input devices 1840 enable the user to communicate information and select commands to the electronic system. The input devices 1840 include alphanumeric keyboards and pointing devices (also called "cursor control devices"), cameras (e.g., webcams), microphones or similar devices for receiving voice commands, etc. The output devices 1845 display images generated by the electronic system or otherwise output data. The output devices 1845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 18, bus 1805 also couples electronic system 1800 to a network 1825 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the invention.

Some embodiments include electronic components, such as microprocessors, storage and memory that store computer application instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer application that is executable by at least one processing unit and includes sets of instructions for performing various operations. Examples of computer applications or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures such as FIGS. 2, 5, 7, 12A-12B, 13A-13B, and 14A-14B conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of conserving power for a navigation daemon of a navigation application of a device, the method comprising:
    by the navigation daemon, determining a remaining time to departure for on time arrival to an event stored in a calendar application of the device, the remaining time to departure for on time arrival to the event determined based on a current time, a starting time of the event, and an estimated travel time from a current location of the device to a location of the event;
    providing the remaining time to departure from the navigation daemon to the calendar application;
    by the navigation daemon, calculating an amount of time to wait before providing a next update to the remaining time to departure for on time arrival to the event as a function of the remaining time to departure;
    setting a timer based on the calculated amount of time to wait; and
    after an expiration of the timer, repeating the determining, providing, calculating, and setting a plurality of times, wherein the amount of time to wait before providing the next update decreases as the current time approaches the starting time of the event.

2. The method of claim 1, wherein calculating the amount time to wait before providing the next update comprises utilizing a function that maps the time for providing the next update as a function of a remaining free time before the time to departure for the on time arrival to the event.

3. The method of claim 1, wherein setting the timer comprises setting a flexible timer to wake up the navigation daemon, the flexible timer specifying a time for wake up as the time for providing the update with a tolerance allowing the navigation daemon to wake up a predetermined amount of time prior to the time for providing the update.

4. The method of claim 1 further comprising receiving a location of the event and the starting time of the event from the calendar application prior to determining the remaining time to departure for the on time arrival to the event.

5. The method of claim 1 further comprising:
    requesting a low precision, low power consuming, estimate utilizing WiFi for the current location of the device from a set of servers external to the device; and
    receiving a low precision estimate for the current location of the device from the set of servers in response to the request.

6. The method of claim 1 further comprising receiving a route from the current location of the device to the location of the event from a set of servers external to the device.

7. The method of claim 6 further comprising adjusting the amount of time to wait before providing the next update to the remaining time to departure based on traffic conditions on the route from the current location of the device and the location of the event.

8. The method of claim 1 further comprising:
    reducing the amount of time to wait before providing the next update to the remaining time to departure for the on time arrival to the event when current traffic conditions are worse than a historical average of traffic conditions; and
    increasing the amount of time to wait before providing the next update to the remaining time to departure for the on time arrival to the event when the current traffic conditions are lighter than the historical traffic conditions.

9. A non-transitory computer readable medium storing a program for conserving power for a navigation daemon of a navigation application of a device, the program executable by at least one processing unit, the program comprising sets of instructions for:
    determining, by the navigation daemon, a remaining time to departure for on time arrival to an event stored in a calendar application of the device, the remaining time to departure for on time arrival to the event determined based on a current time, a starting time of the event, and an estimated travel time from a current location of the device to a location of the event;
    providing the remaining time to departure from the navigation daemon to the calendar application;
    calculating, by the navigation daemon, an amount of time to wait before providing a next update to the remaining time to departure for on time arrival to the event as a function of the remaining time to departure;
    setting a timer based on the calculated amount of time to wait; and
    after an expiration of the timer, repeating the determining, providing, calculating, and setting a plurality of times, wherein the amount of time to wait before providing the next update decreases as the current time approaches the starting time of the event.

10. The non-transitory computer readable medium of claim 9, wherein the set of instructions for calculating the amount time to wait before providing the next update comprises a set of instructions for utilizing a function that maps the time for providing the next update as a function of a remaining free time before the time to departure for the on time arrival to the event.

11. The non-transitory computer readable medium of claim 9, wherein the set of instructions for setting the timer comprises a set of instructions for setting a flexible timer to wake up the navigation daemon, the flexible timer specifying a time for wake up as the time for providing the update with a tolerance allowing the navigation daemon to wake up a predetermined amount of time prior to the time for providing the update.

12. The non-transitory computer readable medium of claim 9, the program further comprising a set of instructions for receiving a location of the event and the starting time of the event from the calendar application prior to determining the remaining time to departure for the on time arrival to the event.

13. The non-transitory computer readable medium of claim 9, the program further comprising sets of instructions for:
requesting a low precision, low power consuming, estimate utilizing WiFi for the current location of the device from a set of servers external to the device; and
receiving a low precision estimate for the current location of the device from the set of servers in response to the request.

14. The non-transitory computer readable medium of claim 9, the program further comprising a set of instructions for receiving a route from the current location of the device to the location of the event from a set of servers external to the device.

15. The non-transitory computer readable medium of claim 14, the program further comprising a set of instructions for adjusting the amount of time to wait before providing the next update to the remaining time to departure based on traffic conditions on the route from the current location of the device and the location of the event.

16. The non-transitory computer readable medium of claim 9, the program further comprising sets of instructions for:
reducing the amount of time to wait before providing the next update to the remaining time to departure for the on time arrival to the event when current traffic conditions are worse than a historical average of traffic conditions; and
increasing the amount of time to wait before providing the next update to the remaining time to departure for the on time arrival to the event when the current traffic conditions are lighter than the historical traffic conditions.

17. A device comprising:
a set of processing units; and
a non-transitory machine readable medium storing a program which when executed by at least one of the processing units conserves power for a navigation daemon of a navigation application of a device, the program executable by at least one processing unit, the program comprising sets of instructions for:
determining, by the navigation daemon, a remaining time to departure for on time arrival to an event stored in a calendar application of the device, the remaining time to departure for on time arrival to the event determined based on a current time, a starting time of the event, and an estimated travel time from a current location of the device to a location of the event;
providing the remaining time to departure from the navigation daemon to the calendar application;
calculating, by the navigation daemon, an amount of time to wait before providing a next update to the remaining time to departure for on time arrival to the event as a function of the remaining time to departure;
setting a timer based on the calculated amount of time to wait; and
after an expiration of the timer, repeating the determining, providing, calculating, and setting a plurality of times, wherein the amount of time to wait before providing the next update decreases as the current time approaches the starting time of the event.

18. The device of claim 17, wherein the set of instructions for calculating the amount time to wait before providing the next update comprises a set of instructions for utilizing a function that maps the time for providing the next update as a function of a remaining free time before the time to departure for the on time arrival to the event.

19. The device of claim 17, wherein the set of instructions for setting the timer comprises a set of instructions for setting a flexible timer to wake up the navigation daemon, the flexible timer specifying a time for wake up as the time for providing the update with a tolerance allowing the navigation daemon to wake up a predetermined amount of time prior to the time for providing the update.

20. The device of claim 17, the program further comprising a set of instructions for receiving a location of the event and the starting time of the event from the calendar application prior to determining the remaining time to departure for the on time arrival to the event.

21. The device of claim 17, the program further comprising sets of instructions for:
requesting a low precision, low power consuming estimate, utilizing WiFi estimate for the current location of the device from a set of servers external to the device; and
receiving a low precision estimate for the current location of the device from the set of servers in response to the request.

22. The device of claim 17, the program further comprising a set of instructions for receiving a route from the current location of the device to the location of the event from a set of servers external to the device.

23. The device of claim 22, the program further comprising a set of instructions for adjusting the amount of time to wait before providing the next update to the remaining time to departure based on traffic conditions on the route from the current location of the device and to the location of the event.

24. The device of claim 17, the program further comprising sets of instructions for:
reducing the amount of time to wait before providing the next update to the remaining time to departure for the on time arrival to the event when current traffic conditions are worse than a historical average of traffic conditions; and
increasing the amount of time to wait before providing the next update to the remaining time to departure for the on time arrival to the event when the current traffic conditions are lighter than the historical traffic conditions.

* * * * *